(12) United States Patent
Pence et al.

(10) Patent No.: US 6,999,758 B2
(45) Date of Patent: Feb. 14, 2006

(54) SYSTEM AND METHOD FOR PROVIDING COMMUNICATIONS SERVICES

(75) Inventors: Joseph A. Pence, Fishers, IN (US); Larry S. Wechter, Indianapolis, IN (US); Joseph Durkee, Noblesville, IN (US); Roundell Harris, Jr., Indianapolis, IN (US)

(73) Assignee: OCMC, Inc., Carmel, IN (US)

( * ) Notice: Subject to any disclaimer, the term of this patent is extended or adjusted under 35 U.S.C. 154(b) by 40 days.

(21) Appl. No.: 10/430,791

(22) Filed: May 6, 2003

(65) Prior Publication Data

US 2004/0223603 A1 Nov. 11, 2004

(51) Int. Cl.
*H04M 3/42* (2006.01)

(52) U.S. Cl. ........................................ 455/417; 455/431
(58) Field of Classification Search ............. 379/265.01
See application file for complete search history.

(56) References Cited

U.S. PATENT DOCUMENTS

| 4,106,060 A | | 8/1978 | Chapman, Jr. | |
| 4,967,288 A | | 10/1990 | Mizutori et al. | |
| 5,136,633 A | * | 8/1992 | Tejada et al. | ............. 379/91.02 |

(Continued)

FOREIGN PATENT DOCUMENTS

| EP | 0 99 685 A2 | 5/2000 |
| GB | 2 342 202 A | 4/2000 |
| WO | WO 01/74041 A2 | 10/2001 |

OTHER PUBLICATIONS

Datasheet: Intel© NetStructure™ DM/v480A–2T1, DM/V960A–4T1, and DM/V1200A–E1: Combined Media Boards (Dec., 2003).

*Primary Examiner*—Creighton Smith

(74) *Attorney, Agent, or Firm*—Ice Miller

(57) ABSTRACT

An enhanced services system for a telecommunications network includes operator equipment accessible by an operator, and a routing system for routing a call from a caller to the operator equipment. The caller may access e-mail creation and delivery service and/or interpreter services. A method of sending an electronic message includes routing a call from a caller to operator equipment using a routing system, inputting information provided by the caller into the operator equipment to create an electronic message, and sending the electronic message to at least one recipient. A method of translating a telephone conversation includes providing a routing system to connect to operator equipment a call from a caller, routing the call to the operator equipment using the routing system to enable communications between at least the caller and a bilingual operator, and translating at least a portion of the conversation between the caller and a third party.

54 Claims, 13 Drawing Sheets

U.S. PATENT DOCUMENTS

| | | |
|---|---|---|
| 5,289,535 A | 2/1994 | Bogart et al. |
| 5,404,231 A | 4/1995 | Bloomfield |
| 5,555,290 A | 9/1996 | McLeod et al. |
| 5,559,611 A | 9/1996 | Bloomfield et al. |
| 5,797,092 A | 8/1998 | Cox et al. |
| 5,943,417 A | 8/1999 | Cox et al. |
| 5,966,437 A | 10/1999 | Cox et al. |
| 6,157,706 A | 12/2000 | Rachelson |
| 6,243,450 B1 | 6/2001 | Jansen et al. |
| 6,396,920 B1 | 5/2002 | Cox et al. |
| 6,442,571 B1 | 8/2002 | Haff et al. |
| 6,456,709 B1 | 9/2002 | Cox et al. |
| 6,466,784 B1 | 10/2002 | Cox et al. |
| 6,473,612 B1 | 10/2002 | Cox et al. |
| 6,487,189 B1 | 11/2002 | Eldridge et al. |
| 2001/0044325 A1 | 11/2001 | Cox et al. |
| 2002/0013141 A1 | 1/2002 | Cox et al. |
| 2002/0057784 A1 | 5/2002 | Cox et al. |
| 2002/0077833 A1 | 6/2002 | Arons et al. |
| 2002/0085702 A1 | 7/2002 | Cox et al. |
| 2002/0115431 A1 | 8/2002 | Cox et al. |
| 2002/0159573 A1 | 10/2002 | Hitzeman et al. |
| 2002/0180797 A1 | 12/2002 | Bachmann |
| 2003/0026405 A1 | 2/2003 | Elsey et al. |
| 2003/0027560 A1 * | 2/2003 | Jammal ..................... 455/417 |
| 2003/0032412 A1 | 2/2003 | Cox et al. |
| 2003/0040304 A1 | 2/2003 | Cox et al. |

* cited by examiner

SYSTEM AND METHOD FOR PROVIDING COMMUNICATIONS SERVICES

This application relates to communication service systems and methods of providing communications services.

BACKGROUND

Callers using communications devices have several services available to them from various telecommunications service providers. Some service providers offer automated services to callers without involving an operator. For example, a caller may attempt to use a telephone to place a call to an individual. If the call is long distance, and the telephone (or network) that the caller is using does not support direct dialing of a long distance number, the method of payment must be arranged to complete the call. An example of such services is automatic billing selection in which a program is run offering a caller payment options for the call, such as by using a calling card. The caller then enters the proper digits corresponding to payment by calling card, enters his card information, and the call is connected without involving an operator.

In a further example, if the call is not completed, an automatic call-back feature may be offered in which the dialed number is dialed again automatically. Such auto-redial is chosen or accepted by the caller, and the system from time to time redials the number for a fee until a connection is made. Such offerings are made automatically, again, without involving an operator.

Other services that are available from service providers to callers involve human operators. Examples of known operator assisted services provided to callers include directory assistance, collect calling assistance, and dialing assistance. In directory assistance calls, a user dials a predetermined number that accesses an operator. The caller provides the operator the city or other geographic region and the name of the person or business s/he is attempting to reach. The operator then accesses a database in an effort to find the desired number. If the operator finds the number, the caller is informed of the number and/or connected by the operator.

A variety of architectures and networks are known to provide contexts within which such services can be provided. Both automated and operator assisted services are available through various communications networks from various service providers connected to such networks. Examples of common communications networks are disclosed in U.S. Pat. Nos. 5,289,535 to Bogart, et al. and U.S. Pat. No. 6,411,624 to Christie et al., the disclosures of which are hereby expressly incorporated by reference herein.

SUMMARY

According to one aspect of the present invention, a system for sending an e-mail using a communication network comprises a routing system for receiving a call from a caller, operator equipment to enable communications between an operator and the caller, and an e-mail device. The e-mail device is configured to enable the operator to construct an e-mail from verbal information provided by the caller and to send the e-mail to a recipient designated by the caller. The routing system is operably coupled to the operator equipment and configured to route the call to the operator equipment under a predetermined condition.

Illustratively according to this aspect of the present invention, the routing system includes at least one switch responsive to an instruction set. The instruction set is configured to instruct the switch to route the call to the operator equipment.

Further illustratively according to this aspect of the invention, the routing system includes a computer operatively coupled to the at least one switch, the computer cooperating with the instruction set and the at least one switch to route the call to the operator equipment upon occurrence of the predetermined condition.

Additionally illustratively according to this aspect of the invention, the computer is operably coupled to a database containing data. Further illustratively the predetermined condition may be entry of an access number matching data in the database, or entry of one or more DTMF tones matching data in the database.

Further illustratively according to this aspect of the invention, the routing system includes a computer operably coupled to an instruction set, the computer issuing a first command upon detection of a desired condition, the first command configured to direct a switch to connect the call to the operator equipment.

Additionally illustratively according to this aspect of the invention, the computer is operably coupled to a database containing data. The condition may comprise entry of an access number matching data in the database, an originating number at least part of which matches at least part of a number in the database, or one or more DTMF tones that matches a predetermined one or more DTMF tones.

Further illustratively according to this aspect of the invention, the instruction set issues a second command to the computer to play a call tour to offer at least one service to the caller and request entry of a selection number by the caller. The computer routes the call to the operator equipment when the desired condition comprises one or more DTMF tones that matches a predetermined one or more DTMF tones.

Additionally illustratively, the operator equipment includes a plurality of operator stations.

According to another aspect of the present invention, an enhanced telephone services platform comprises a routing system for receiving a call from a caller, a plurality of operator communications devices each configured to enable communications between an operator and the caller, and an information device configured to enable the operator to construct an e-mail from verbal information provided by the caller and to send the e-mail to a recipient designated by the caller. The routing system is operably and selectively couplable to each operator communications device and configured to operatively couple to a caller communications device used by the caller to route the call to the operator communications device under at least one predetermined condition.

Illustratively according to this aspect of the present invention, at least one of the plurality of the operator communications devices includes a speaking device and a listening device, and is configured to be operatively coupled to the caller communications device during at least a portion of the call so that the operator can serve as an interpreter during the at least a portion of the call.

Further illustratively according to this aspect of the invention, at least one of the plurality of operator communications devices is operatively coupled to an automatic call distribution system configured to route the call to the at least one of the plurality of operator communications devices based on the at least one predetermined condition.

Additionally illustratively according to this aspect of the invention, the automatic call distribution system includes a switch responsive to a command detecting the presence of the at least one predetermined condition.

Further illustratively according to this aspect of the invention, the enhanced services platform further comprises a computer that issues the command based on the predetermined condition of one or more of entry of a DTMF tone by the caller, an originating number, a busy signal, or an access number. Additionally illustratively when the predetermined condition is an access number, the switch may be operatively coupled to a telecommunications network configured to send the access number to the routing system.

According to another aspect of the present invention, a method of sending an electronic message, the details of which are provided by a caller using a communications device to a telephone communications system operator, comprises the steps of: providing an operator equipment, providing a routing system to selectively connect to the operator equipment a call placed by the caller using the communications device, routing the call to the operator equipment using the routing system to enable communications between the caller and the operator, inputting information provided by the caller into the operator equipment to create an electronic message, and sending the electronic message to at least one recipient.

Further illustratively according to this aspect of the invention, inputting information provided by the caller includes inputting verbal information provided by the caller into an alphanumeric readable format.

Additionally illustratively according to this aspect of the invention, providing a routing system includes providing a computer that issues a command for a switch to connect the call to the operator equipment.

Further illustratively according to this aspect of the invention, the method further comprises coupling software to the computer configured to compare an entered DTMF tone entered by a caller to a predetermined DTMF tone. Upon a match of the entered DTMF tone and the predetermined DTMF tone, the computer issues the command to the routing system to connect the call to the operator equipment.

Additionally illustratively according to this aspect of the invention, coupling software to the computer includes coupling software which plays a pre-recorded message prompting a caller to enter a number corresponding to the predetermined DTMF tone to access the operator.

Further illustratively according to this aspect of the invention, the method further comprises coupling software to the computer, the software configured to cooperate with the computer to compare at least a portion of the originating number to a database. Upon a match of the at least a portion of the originating number and a number in the database, the computer issues a command to at least part of the routing system to connect the call to the operator equipment. Additionally illustratively according to this aspect of the invention, the method further comprises coupling software to the computer configured to cooperate with the computer to detect a line condition and compare the detected line condition to at least one known line condition. Upon a match of the detected line condition and the known line condition, a command is issued with the computer to at least part of the routing system to connect the call to the operator equipment.

Further illustratively according to this aspect of the invention, providing a routing system includes providing a computer and a switch wherein the computer issues a command for the switch to connect the call to the operator equipment. Additionally illustratively according to this aspect, the method further comprises coupling software to the computer configured to compare an entered DTMF tone entered by a caller to a predetermined DTMF tone. Upon a match of the entered DTMF tone and the predetermined DTMF tone, the command is issued with the computer to at least part of the routing system to connect the call to the operator equipment. Further illustratively according to this aspect, coupling software to the computer includes software which plays a pre-recorded message prompting a caller to enter a number corresponding to the predetermined DTMF tone to access the operator.

Additionally illustratively according to this aspect of the invention, the method further comprises the step of confirming the accuracy of the information input.

According to another aspect of the present invention, a system for translating a conversation using a telecommunications network comprises a routing system for receiving a call from a caller, and an operator equipment to enable communications between an operator and the caller. The routing system is operably coupled to the operator equipment and configured to route the call to the operator equipment under a predetermined condition to create a first connection. The operator equipment includes an operator terminal to permit the operator to connect the call with a communications device of a third party creating a second connection to enable communication between at least the caller and the third party, and to enable communications between the operator and at least the caller during at least a portion of the call. At least one of the first and second connections transmits a first verbal information from the operator, the first verbal information including a translation of a second verbal information from one of the caller and the third party to the other of the caller and the third party.

Further illustratively according to this aspect of the invention, the operator equipment, the routing system, the first connection, and the second connection are configured so that the operator is in communication with both the caller and the third party during at least a portion of the call.

Additionally illustratively according to this aspect of the invention, the routing system includes at least one switch responsive to an instruction set, the instruction set configured to instruct the switch to route the call to the operator equipment.

Further illustratively according to this aspect of the invention, the routing system includes a computer operatively coupled to the at least one switch, the computer cooperating with the instruction set and the at least one switch to route the call to the operator equipment upon occurrence of the predetermined condition.

Additionally illustratively according to this aspect of the invention, the computer is operably coupled to a database containing data, and wherein the predetermined condition is an entry of an access number matching data in the database. Further illustratively, the predetermined condition is an entry of one or more DTMF tones matching data in the database.

Additionally illustratively according to this aspect of the invention, the routing system includes a computer operably coupled to an instruction set, the computer issuing a first command upon detection of a desired condition, the first command configured to direct a switch to connect the call to the operator equipment. Further illustratively according to this aspect, the computer is operably coupled to a database containing data, and the wherein the desired condition detected is entry of an access number. Additionally illustratively according to this aspect, the desired condition detected is an originating number at least part of which matches at least part of a number in the database.

Further illustratively according to this aspect of the invention, the instruction set issues a second command to the computer to play a call tour to offer at least one service to the caller and request entry of a selection number by the caller. The desired condition comprises one or more DTMF tones that matches a predetermined one or more DTMF tones.

Additionally illustratively according to this aspect of the invention, the operator equipment includes a plurality of operator terminals.

According to another aspect of the present invention, an enhanced services system for a telecommunications network comprises operator equipment accessible by an operator serving in the enhanced services system, a routing system for selectively routing a call from a caller to the operator equipment, the routing system including a computer and software accessible by the computer, the computer cooperating with the software to route the call to the operator equipment upon an occurrence of a predetermined condition. The predetermined condition is a member selected from the group consisting of: an entry of an access number to reach the operator equipment, an entry of one or more DTMF tones in response to a call tour requesting the entry, and a detection of a predetermined line condition.

Illustratively according to this aspect of the present invention, the predetermined condition is the entry of one or more DTMF tones, and the software cooperates with the computer to play the call tour, the call tour providing to the caller instructions for selecting one of at least an e-mail delivery service and a translation service, both the e-mail and translation services provided by an operator.

Further illustratively according to this aspect of the invention, the predetermined condition is the entry of an access number, and based on the access number the call is routed to one of an e-mail delivery service or a translation service.

Additionally illustratively according to this aspect of the invention, the software and computer are operatively coupled to a database containing data relating to the validity of the access number, wherein the call tour is selected based on a match of data in the database and at least a portion of the access number.

Further illustratively according to this aspect of the invention, the software and computer further cooperate to perform a payment module including a payment instruction provided to the caller to enter payment information, and the software and computer further cooperate to determine the validity of the payment information. Additionally illustratively according to this aspect, the software and computer are operatively coupled to a database containing data relating to validity of payment information. Further illustratively, the data may relate to validity of charging the service to an originating number. Additionally illustratively, the data may relate to validity of charging the service to a pre-paid card account. Further illustratively, the data may relate to validity of charging the service to a third party number.

According to another aspect of the present invention, a method of translating a telephone conversation comprises the steps of providing an operator equipment, providing a routing system to selectively connect to the operator equipment a call placed by the caller using a communications device, routing the call to the operator equipment using the routing system to enable communications between at least the caller and a bilingual operator, and translating at least a portion of the conversation between a caller and a third party.

Illustratively according to this aspect of the present invention, the method further comprises the step of using the operator equipment to connect the third party to the call.

Additionally illustratively according to this aspect of the invention, the method further comprises the step of connecting the call to the operator equipment after the caller and the third party are in the call.

Additionally illustratively according to this aspect of the invention, translating at least a portion of the conversation includes translating at least a portion of the words spoken by the caller to the third party. Further illustratively according to this aspect of the invention, translating at least a portion of the conversation includes translating at least a portion of the words spoken by the third party to the caller.

Additionally illustratively according to this aspect of the invention, providing a routing system includes providing a routing system including a computer that issues a command for a switch to connect the call to the operator equipment. Further illustratively according to this aspect of the invention, the method further comprises coupling software to the computer configured to compare an entered DTMF tone entered by a caller to a predetermined DTMF tone. Upon a match of the entered DTMF tone and the predetermined DTMF tone, a command is issued with the computer to the routing system to connect the call to the operator equipment. Additionally illustratively according to this aspect of the invention, coupling software to the computer includes coupling software to the computer which plays a pre-recorded message prompting a caller to enter a number corresponding to the predetermined DTMF tone to access the operator.

Further illustratively according to this aspect of the invention, the method further comprises coupling software to the computer configured to cooperate with the computer to compare at least a portion of the originating number to a database. Upon a match of the at least a portion of the originating number and a number in the database, the computer issues a command to the routing system to connect the call to the operator equipment.

Additionally illustratively according to this aspect of the invention, the method further comprises coupling software to the computer configured to cooperate with the computer to detect a line condition and compare the detected line condition to at least one known line condition. Upon a match of the detected line condition and the known line condition, the computer issues a command to the routing system to connect the call to the operator equipment.

Further illustratively according to this aspect of the invention, providing a routing system includes providing a routing system including a computer and a switch wherein the computer issues a command for the switch to connect the call to the operator equipment.

Additionally illustratively according to this aspect of the invention, the method further comprises coupling software to the computer configured to compare an entered DTMF tone entered by a caller to a predetermined DTMF tone and, upon a match of the entered DTMF tone and the predetermined DTMF tone, the computer issues a command to the routing system to connect the call to the operator equipment.

Further illustratively according to this aspect of the invention, coupling software to the computer includes coupling software to the computer which plays a pre-recorded message prompting a caller to enter a number corresponding to the predetermined DTMF tone to access the operator.

Additionally illustratively according to this aspect of the invention, providing a routing system includes providing a routing system configured to route a first call to a first access number and a second call to a second access number. The first and second access numbers cause the routing system to route the first and second calls to different operator equipment. The first access number is an access number for an operator equipment accessible by an operator capable of translating a first language. The second access number is an access number for an operator equipment accessible by an operator capable of translating a second language.

According to another aspect of the present invention, a computer readable medium having stored thereon a plurality of sequences of instructions which when executed by a processor, cause the processor to perform a method comprising the steps of determining entry of an access number for accessing an operator equipment which, in cooperation with a routing system, enables a bilingual operator to communicate with a caller and a third party, issuing a command for a switch to connect the call to the operator equipment, and routing a call to the operator equipment using the routing system to enable communications between at least the caller and the bilingual operator.

Illustratively according to this aspect of the present invention, the method further comprises the step of connecting the call to the third party upon receipt of a command from the operator equipment.

Further illustratively according to this aspect of the invention, the method further comprises the step of connecting the call to the third party upon receipt of a command from the caller equipment.

Additionally illustratively according to this aspect of the invention, the method further comprises the step of selecting a call tour based on the access number and playing the call tour to the caller.

Further illustratively according to this aspect of the invention, the method further comprises the step of querying a first database and comparing a first information detectable about the call to the database to select the call tour.

Additionally illustratively according to this aspect of the invention, the method further comprises the steps of querying a first database and comparing a first information detectable about the call to the first database. Upon failure to find a matching value in the database, a second database is queried and the first information is compared to the second database to select the call tour.

Further illustratively according to this aspect of the invention, the method further comprises the step of populating a brand field to play an audible brand to the caller.

According to another aspect of the present invention, a computer readable medium having stored thereon a plurality of sequences of instructions which when executed by a processor, cause the processor to perform a method comprising the steps of determining entry of an access number for accessing an operator equipment which, enables an operator to create and send an e-mail to a third party based on input from the a caller, issuing a command for a switch to connect the call to the operator equipment, and routing a call to the operator equipment using the routing system to enable communications between the caller and the operator.

Illustratively according to this aspect of the present invention, the method further comprises the steps of selecting a call tour based on the access number and playing the call tour to the caller.

Further illustratively according to this aspect of the invention, the method further comprises the step of querying a first database and comparing a first information detectable about the call to the database to select the call tour.

Additionally illustratively according to this aspect of the invention, the method further comprises the steps of querying a first database and comparing a first information detectable about the call to the first database. Upon failure to find a matching value in the database, a second database is queried and the first information is compared to the second database to select the call tour.

Further illustratively according to this aspect of the invention, the method further comprises the step of populating a brand field to play an audible brand to the caller.

Additional features and advantages of the invention will become apparent to those skilled in the art upon consideration of the following detailed description of a preferred embodiment exemplifying the best mode of carrying out the invention as presently perceived.

DETAILED DESCRIPTION

Figure 1:
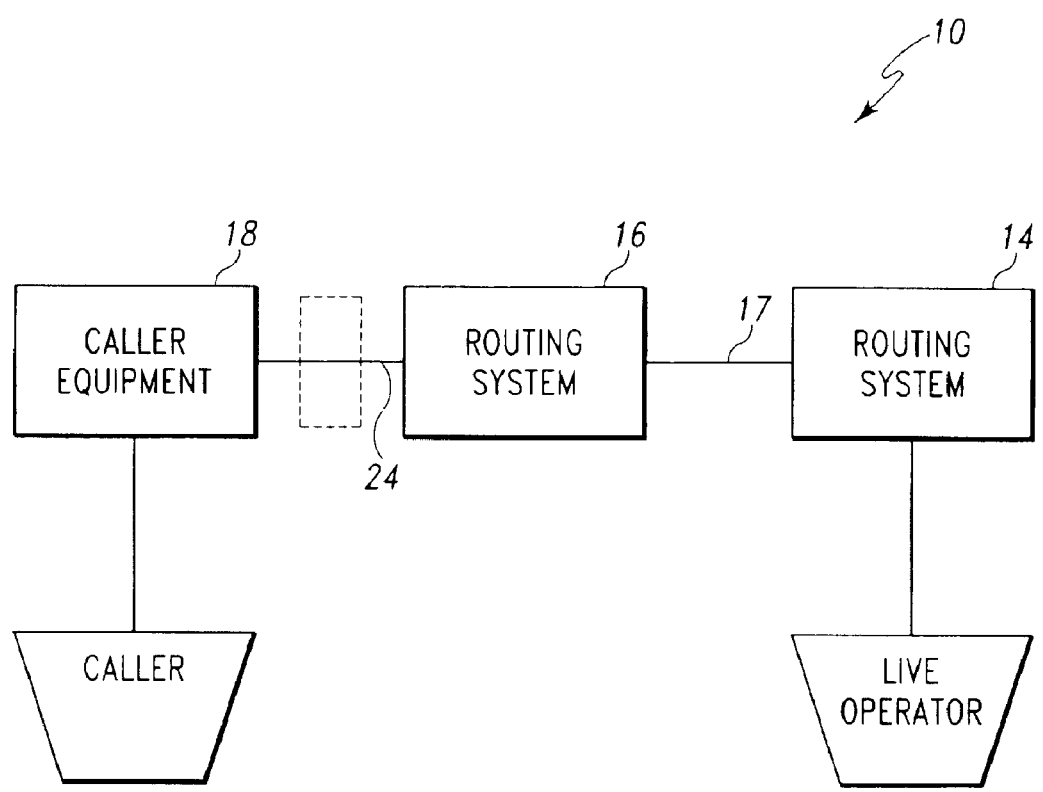
FIG. 1 is a diagram of one embodiment of an enhanced services platform showing an exemplary caller equipment, a routing system, and an operator equipment.
Figure 2:
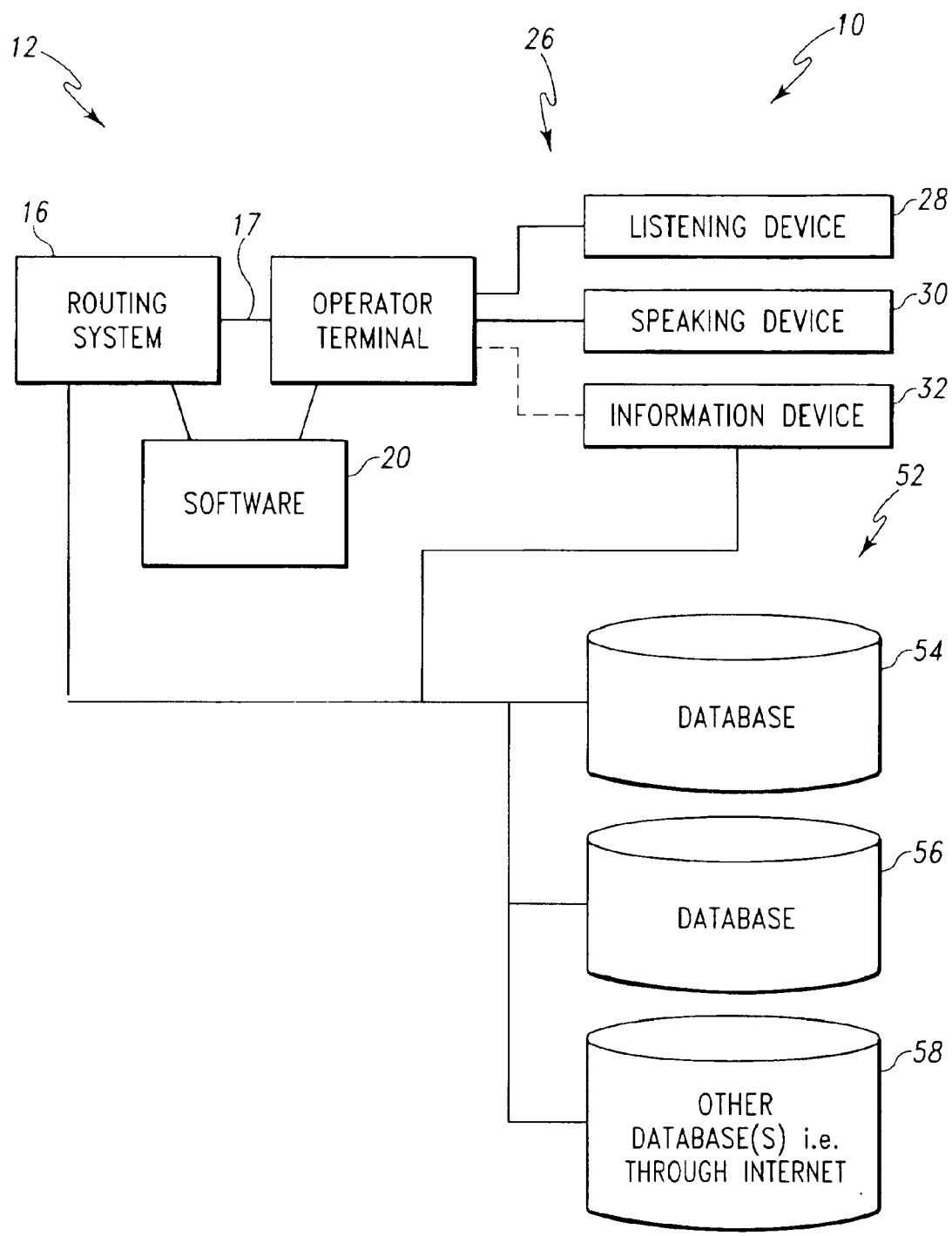
FIG. 2 is a diagram of one embodiment of the operator equipment in the context of a translation service provided to a caller.
Figure 3:
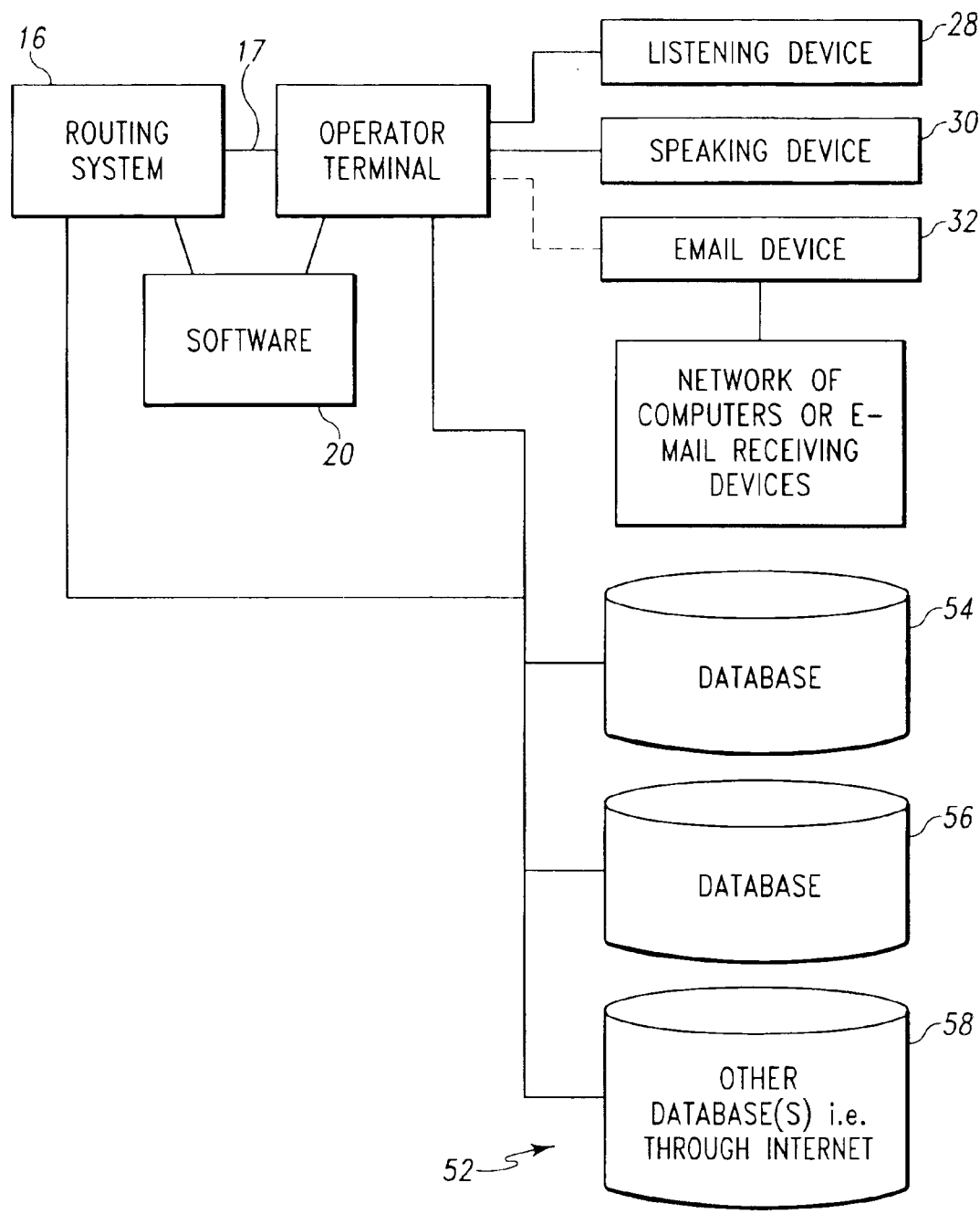
FIG. 3 is a diagram of one embodiment of the routing system and the operator equipment in the context of an e-mail service provided to a caller.

Referring to FIGS. 1–3, enhanced services platform 10 includes operator services architecture 12 having operator equipment 14 and a routing system 16 to selectively permit communication between an operator and a caller. The caller accesses an operator having access to operator equipment 14 through link 17. Using caller equipment 18, the caller can access this operator in any number of ways, as described more fully below. The operator and caller communicate to complete the services requested by the caller.

Figure 5:
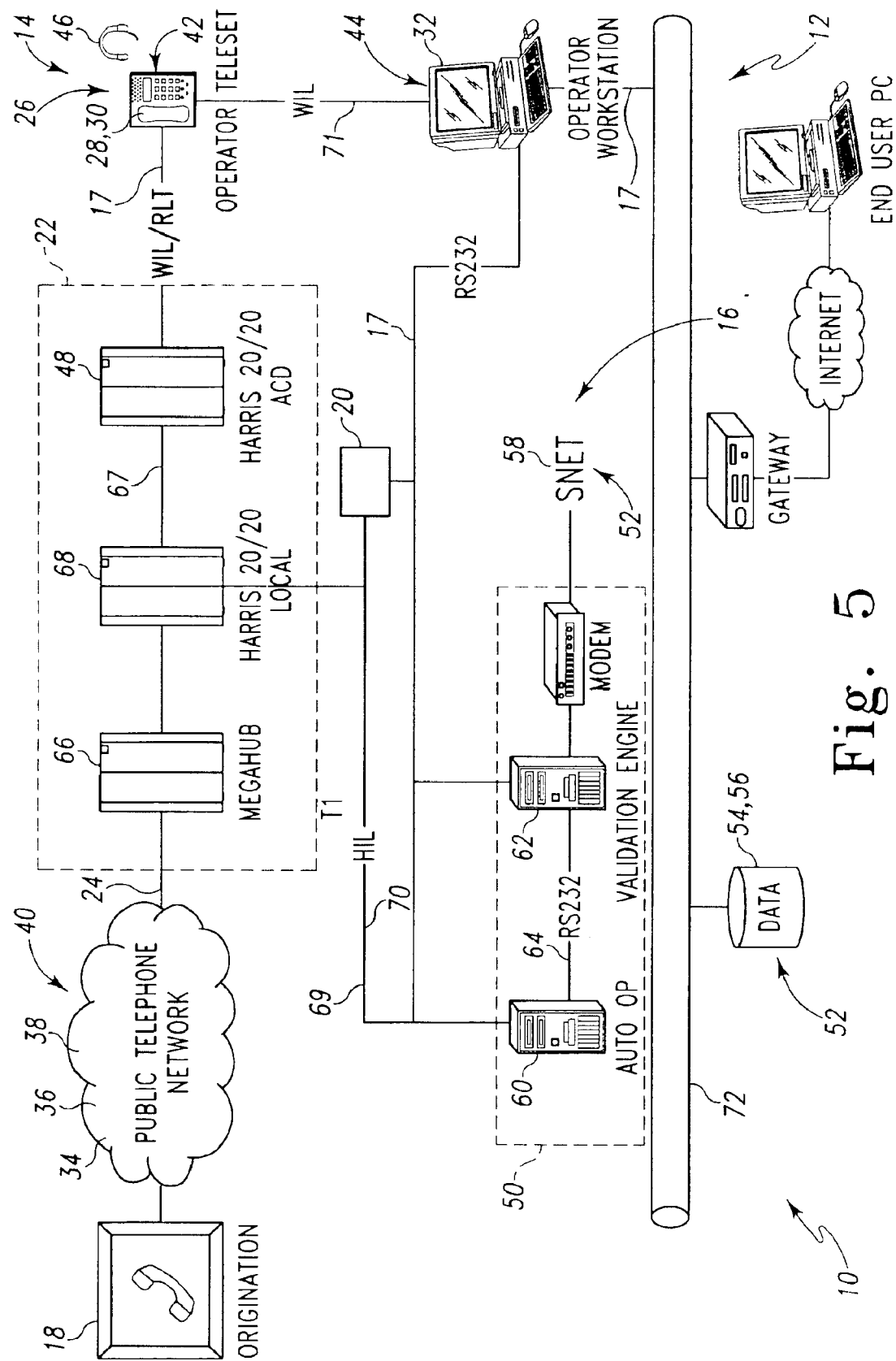
FIG. 5 is a diagram of one embodiment of an illustrative enhanced services platform showing an exemplary switch configuration, an exemplary computer configuration, and exemplary connections, and of a communication network, the Internet, and memory in the form of databases accessible by the computer.

As shown in FIGS. 2 and 3, enhanced services platform 10 further includes software 20 cooperating with other portions of routing system 16 and operator services architecture 12. As a result of this cooperation, a caller gains access to the enhanced services provided as part of enhanced services platform 10. As shown in the embodiment of FIG. 5, routing system 16 includes a switch 22. In another embodiment, routing system 16 is operably coupled to a switch that is included in existing system architecture, such as network 40 of FIG. 5. Thus, enhanced services platform 10 can take the form of a platform that includes its own switch(es) or a platform that is implemented into existing switching architecture where the switch(es) is (are) already in place.

Enhanced services platform 10 is capable of automatically connecting a caller to enhanced services as described herein. Enhanced services platform 10 selectively enables a caller to access, and/or fund, the enhanced service desired by the caller. As suggested by FIGS. 2 and 3, enhanced services are provided by a live operator, who provides one or more of e-mail services 148 including preparation and sending, and translation or interpretation services 150 (hereinafter "translation services").

As shown by way of illustration in FIG. 5, operator equipment 14 may include, for example, operator communication device 26 including a listening device 28 and speaking device 30. Listening device 28 and speaking device 30 may be part of a single apparatus such as a headset 46 commonly used by operators, shown in FIG. 5 separated from other operator equipment 14. As shown in FIG. 5, operator communication device 26 may include a separate operator base or "teleset" 42 that receives a call from routing system 16. As shown in FIG. 5, teleset 42 may include a standard cradle and receiver, may be coupled to headset 46, or may include other suitable listening and speaking devices 28, 30.

Further, operator equipment 14 may include an operator information device, such as an operator computer or work station 44 as shown in FIG. 5, for example. Using operator equipment 14, an operator may engage the caller in conversation and render services requested by the caller. For example, the information device may be an e-mail device 32, as shown in FIG. 3, used by the operator to enter information to compose and send an e-mail according to the instruction of the caller. Alternatively, the information device may be used by the operator as suggested in FIG. 2 to assist the operator in providing translation services for the caller during a call. In this example, the operator may have access through the information device to a database or the Internet to look up words with which the operator is not familiar. The information device and communication device 26, although shown separate, may be part of a single device such as a computer that can serve as one, the other, or both of a communications device and an information device.

Caller equipment 18 may include, for example, a corded or cordless telephone, a cellular or satellite telephone, a personal digital assistant, a computer, or other communications devices. Caller equipment 18 enables a caller to initiate a communications session, such as a telephone call (referred to herein as a "call"), in which the caller may access enhanced services. As shown in FIG. 5, caller equipment 18 is operatively coupled, as described more fully below, to a switch 22 by link 24. Switch 22 may be coupled to other switches 34 and links 36 which in turn are coupled to other caller equipment 38, and/or further links and switches, etc., forming a communications network 40, such as shown in FIG. 5.

Routing system 16, shown illustratively in FIG. 5 as including switch 22, is accessible by a caller in a variety of ways. For example the caller may dial a toll free number, dial a local number, or enter a sequence of digits and/or symbols in a call. Additionally, routing system 16 and customer equipment 18 can be connected directly from the local exchange when the originating number is defined as one to be routed to switch 22. Further, other providers of telecommunications services may have software and architecture that cooperate to offer a caller using such services an opportunity to access the enhanced services described herein. Such other providers' software and architecture may be programmed to dial an access number which connects the caller to routing system 16. Any of these numbers or digit and/or symbol sequences can constitute an "access number" which routes a call to routing system 16, switch 22, operator equipment 14, a call tour, or a menu module 78, within the meaning of the term "access number" as used herein. Further still, caller equipment 18 may be configured to connect directly to routing system 16—for example to first switch 66 described below—to permit the caller equipment to access the enhanced services platform 10 without entering a particular access number.

As illustrated in FIG. 5, enhanced services platform 10 further includes a computer 50 operatively coupled to switch 22. As is known to those of ordinary skill in the art, computer 50 processes calls initiated by the caller, and cooperates with switch 22 to route the call according to certain information provided by the caller and/or identifiable about the call. Computer 50 can include one or more separate computers, which can take a variety of forms. Although the term "computer" is used herein, the term is not intended to be limiting, and it should be understood that other means of processing information are within the scope of this disclosure and can be used in place of the embodiment(s) of computer 50 illustratively described herein. For example, other suitable computing systems may include one or more processors, one or more servers performing one or more functions each, and other suitable arrangements. Switch 22 can also take a variety of forms, including but not limited to a Harris 20—20 and an Alcatel Megahub switching system, described in more detail below.

As shown in FIG. 5, computer 50 is operatively coupled to memory 52. Memory 52 illustratively includes first database 54 and second database 56, each accessible by computer 50. First database 54 includes originating number data to determine whether specific services are supported by the number from which the caller is calling. Second database 56 includes data relating to the routing and/or handling of calls. Other databases, for example database 58 may also be coupled to computer 50. As shown in FIG. 5, database 58 is accessed by computer 50 through a communications network. In this exemplary configuration, database 58 is part of and accessible through a service offered through SBC SNET (formerly Southern New England Telephone of New Haven, CT) ("SNET"), permitting account monitoring and validity determination of a payment method selected by the caller. Database 58 contains information from LIDB services which indicate the validity of credit cards, calling cards, and other methods of payment.

As explained further below, a link can be established with one or more local databases 54, 56 or database 58 to determine the validity of a particular payment method, so that the call can be terminated, for example, once the account has insufficient credit to cover a particular charge. The above description of databases 54, 56, 58 are exemplary, and as known by those of ordinary skill in the art, data contained in databases can be stored in numerous locations, a single location, can be accessed in a variety of ways, and can be stored in a number of tabular or other formats. The operation of computer 50 and memory 52 is described in more detail below.

Illustratively, computer 50 comprises a plurality of microprocessing units each performing one or more functions. As illustrated in FIG. 5, one possible configuration of computer 50 includes an automated operator ("auto op") computer 60 and a validation engine or server 62. Auto op computer 60 illustratively is a computer including an Intel® Pentium III® motherboard (not shown), two serial communications ports (not shown) a Dialogic 240SC T1 card ("communications card") (not shown) for coupling to switch 22, a monitor, keyboard and a mouse (the latter three components not shown). As illustrated in FIG. 5, auto op computer 60 and validation engine 62 are coupled with link 64. Switch 22 illustratively comprises a first switch 66, shown as a Mega-Hub® available from Alcatel with United States offices in Calabasas, Calif., a local switch 68, and an automatic call distribution (ACD) switch 48. Illustratively, local and ACD switches are 20—20 switching systems available from Teltronics, Inc. of Sarasota, Fla., sometimes referred to as Harris 20—20 switches.

Referring illustratively to FIG. 5, when a call is placed by the caller, the call is received at a first switch 66 which makes an initial routing decision by querying first routing tables (not shown). If first switch 66 concludes the call should be routed so as to receive enhanced services, then the call is presented or connected to local switch 68. Determinations made by first switch 66 may be based on such information about the call such as an originating number, the circuit on which the call comes to first switch, a number that was dialed by the caller, and the like.

First switch 66 sends a message to local switch 68 concerning the call. Computer 50 and local switch 68 cooperate to evaluate the message to determine further routing of the call. The message, illustratively called a "Present New Call HIL" message, is sent to auto op computer 60 through link 70. The Present New Call HIL message provides call information to auto op computer 60. This call information may include the circuit the call is on, the access number used to reach local switch 68, the originating telephone number, and the like. This call information is illustrative, and it is within the scope of this disclosure to include additional information, other information, or to not include one or more of the listed information.

As a result of the routing determination made by local switch 68, local switch 68 provides information about the call to auto op computer 60. Auto op computer 60 connects to the call circuit once it is ready, and the call is now under the control of the auto op computer 60. Auto op computer 60 now can interact with the caller, and/or the call, to set up which service will be provided and/or how payment is to be made.

In one exemplary configuration, auto op computer 60 creates a validation packet to send to the validation engine 62 to determine if the originating number is valid to originate the call and access the enhanced services platform 10. Auto op computer 60 sends the packet to validation engine 62, which determines validity through cooperation with Oracle application and database servers 74, 75. If the number is valid, auto op computer 60 maintains the call. If the number is not identified as valid, auto op computer 60 sends a release request message to the switch to disconnect the call—the call is dropped by the switch and the voice circuit is placed in an idle state. Instead of dropping the call, it is within the scope of this disclosure to present the caller with other options, for example, other payment options or other service options, or to connect the call with a live operator.

Figure 6:
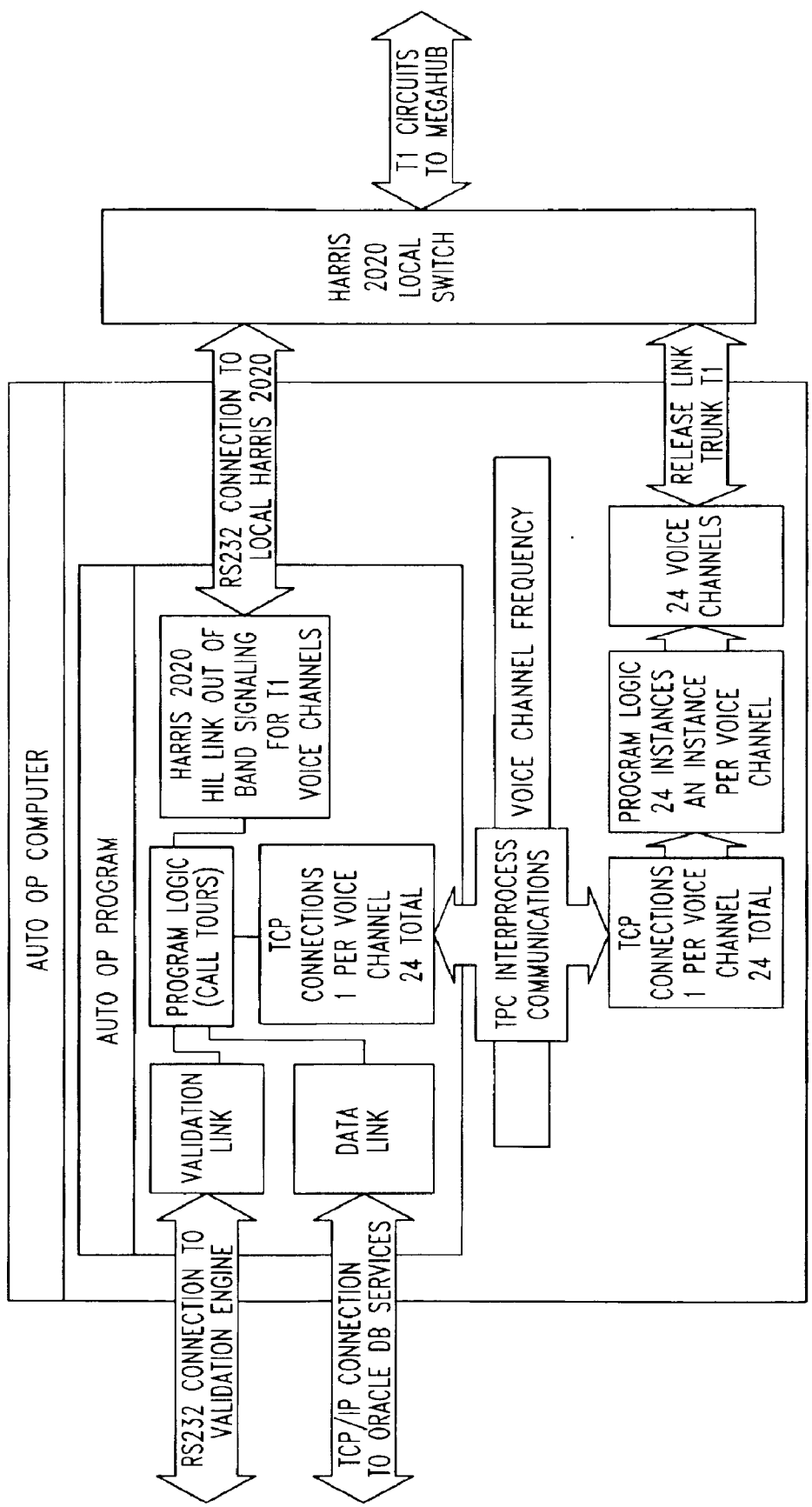
FIG. 6 is a diagram of one embodiment of a portion of a computer showing an illustrative "auto op" computer, and illustrative programs and interaction between and among the auto op computer, programs, switch, databases, and other portions of the computer.
Figure 7A:
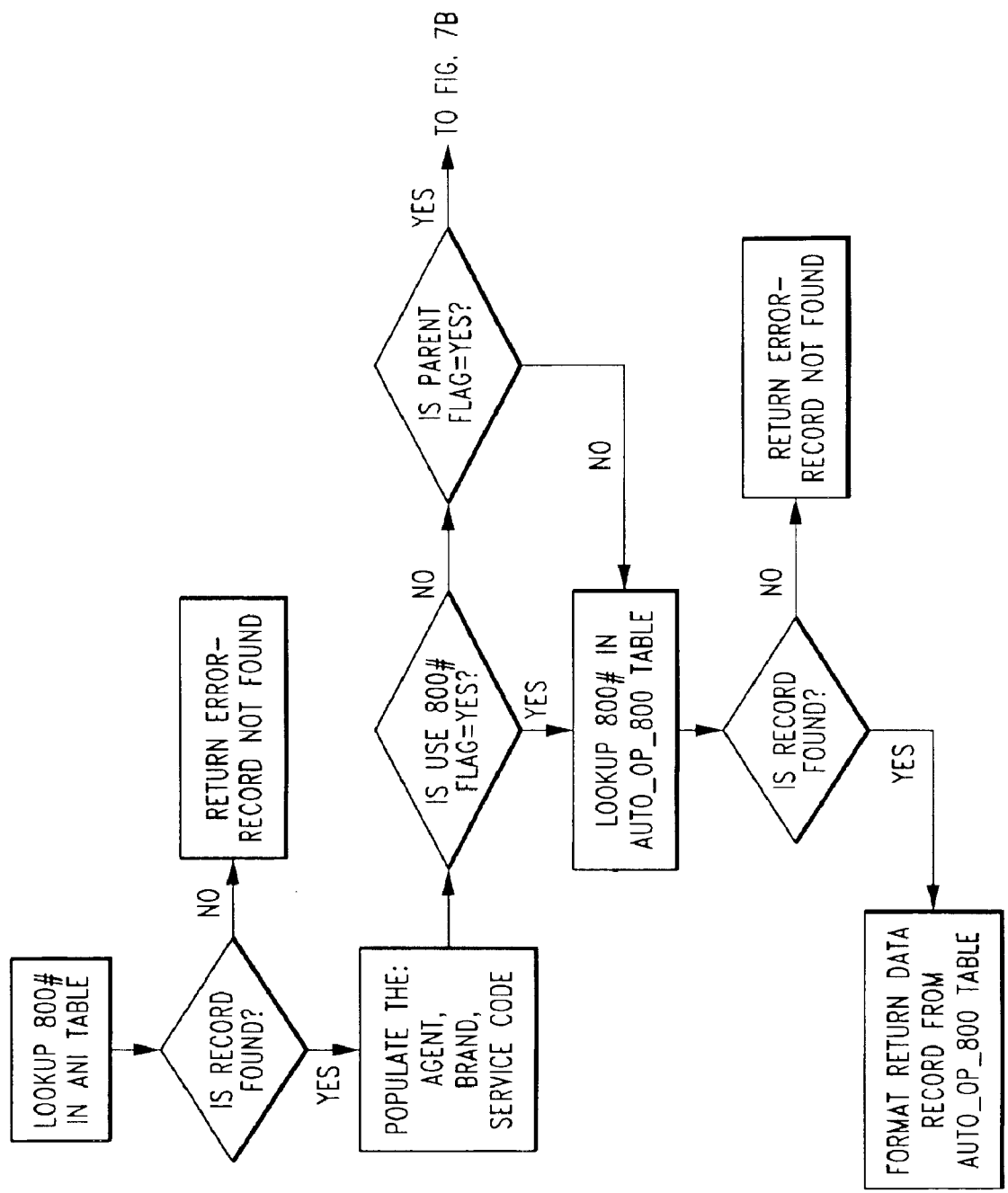
FIG. 7 is a flow chart showing one embodiment of a call tour lookup used once a call reaches the auto op computer to determine how a call is to be handled.
Figure 7B:
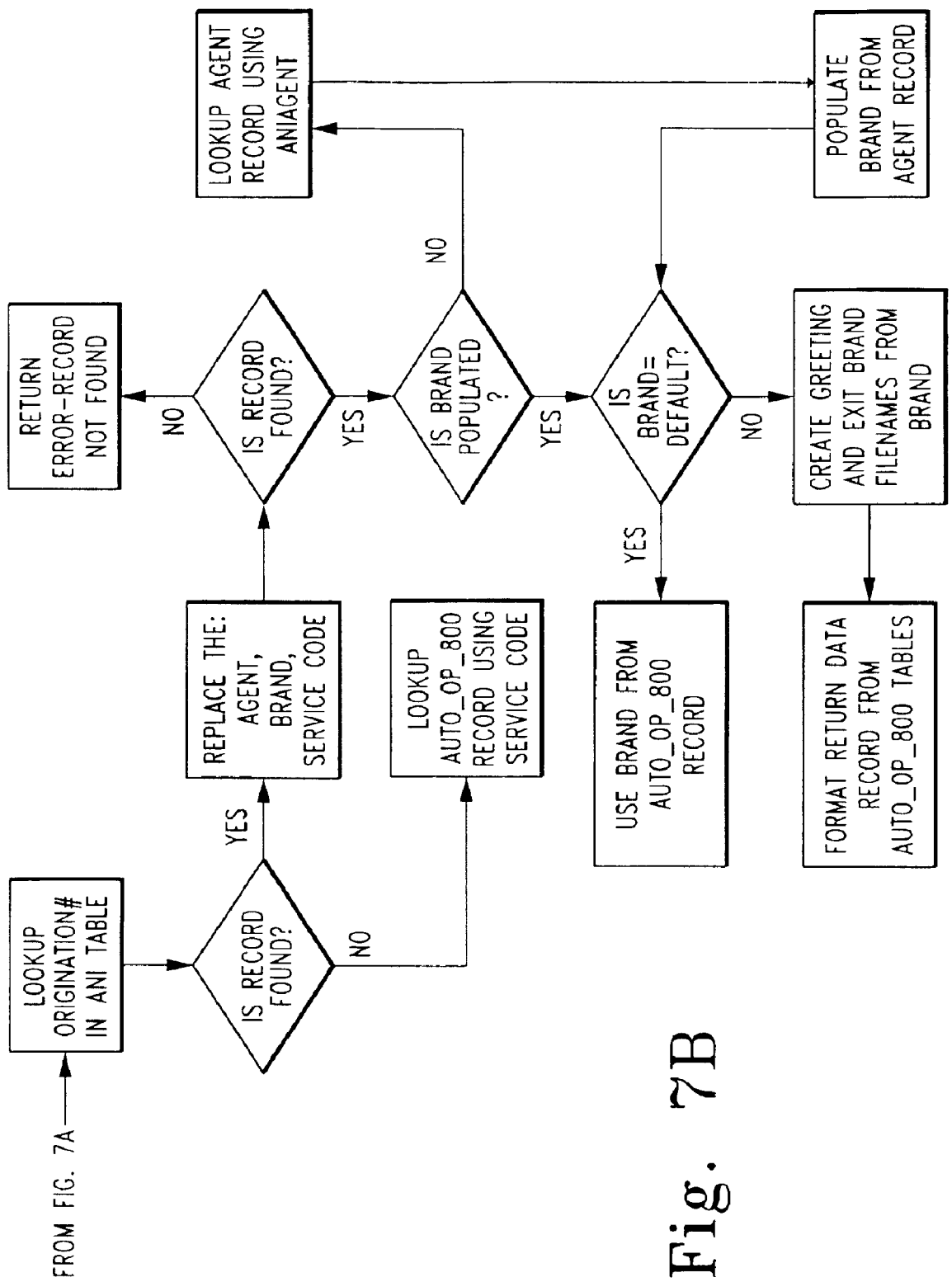
Figure 8:
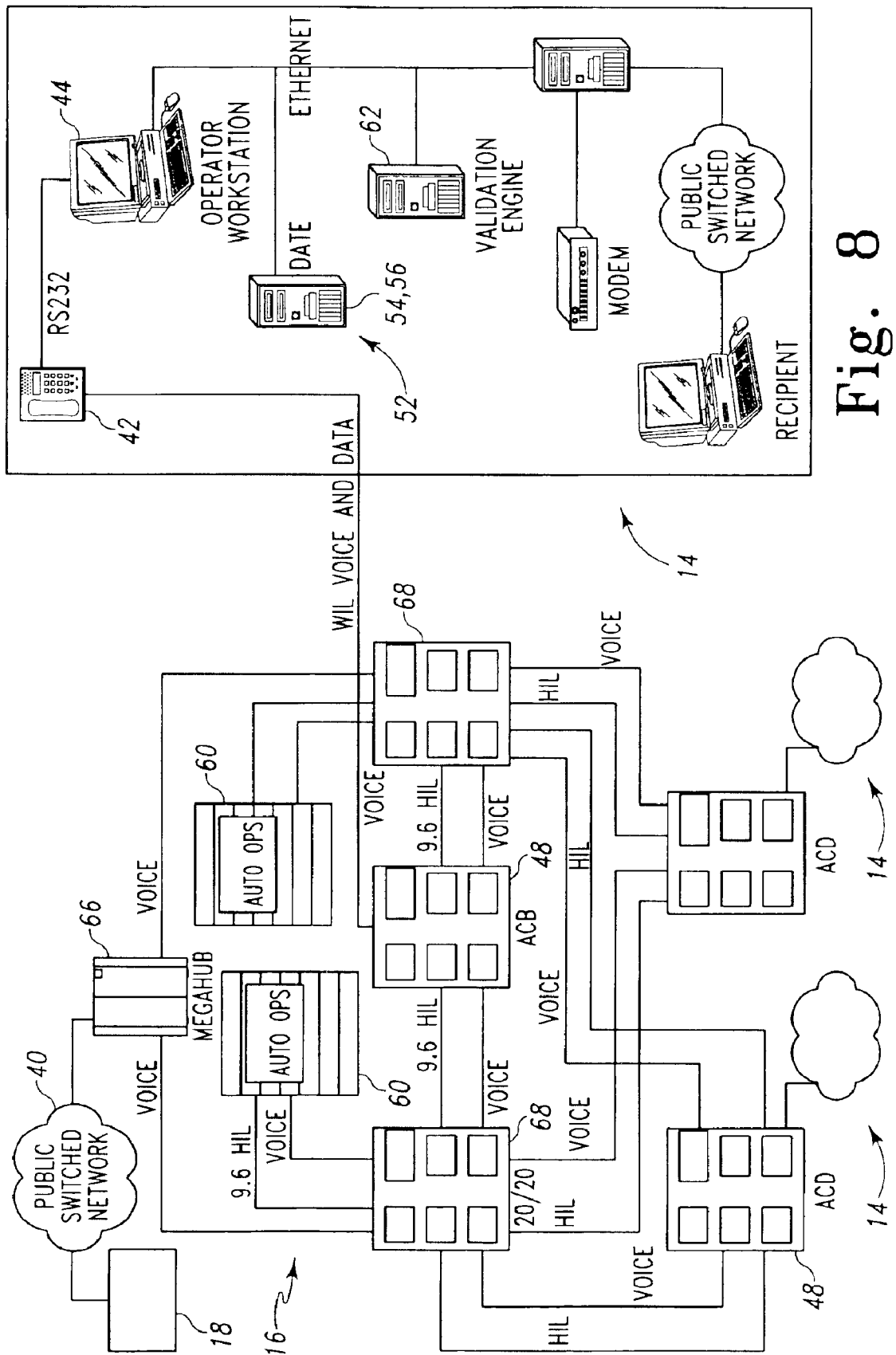
FIG. 8 is a diagram of another embodiment of an enhanced services platform.

Referring to FIGS. 6 and 7, auto op computer 60, if the call is continued, determines what kind of call tour to provide for the call. Auto op computer 60 thus creates an information packet, illustratively a TCP/IP packet. The packet may contain the access number (such as an 800 toll free access number), the originating telephone number, and a database service number.

In an effort to determine what call tour to provide, and/or other call treatment details such as payment method, auto op computer 60 communicates with Oracle database server 75 through the Oracle application server 74 to so determine the call tour. The packet is sent over an Ethernet LAN 72 (sometimes referred to herein as "Ethernet" or "LAN") to Oracle Application Server 74 which controls and manages access to different services provided by the Oracle database.

The packet is processed by the database server, as shown in FIG. 7. By way of illustration, database server 75 accesses two tables. The first accessed is the ANI (Automatic Number Identification) table which contains numbers for which access is provided. The second is the auto op 800 table. Each of the tables contains information which is used to determine what service to provide for the call.

When a call comes in from caller equipment 18, the originating number of which is not loaded in the ANI database, the access number is looked up in the Auto Op 800 table (or database) to determine what kind of service to provide for the call—to determine a default class of service for calls that are not identified by the originating ANI database. A flowchart showing an exemplary lookup sequence and related steps is depicted in FIG. 7.

The database service creates a return packet of information which is returned to auto op computer 60 via TCP/IP. Auto op computer 60 parses the information from the packet which includes the call tour to be played, opening brand, exit brand, etc. Thus, auto op computer 60 has sufficient information about how to treat the call.

The above actions and interactions, and others described herein, are carried out at least in part by providing instructions to processor(s) in computer 50 in the form of software which may be stored in a number of locations or in a single location. Illustratively, software 20 is stored in memory 52; however, software 20 can be stored in any suitable medium accessible by a computer such as computer 50 to run the instructions or modules of software 20.

A particular configuration of software 20 is illustrated in FIGS. 4A–E. Software 20 includes instructions 76 that cause computer 50 to cooperate with switch 22 to connect the caller, specifically caller equipment 18, to operator equipment 14 accessible by a live operator serving in the enhanced services platform 10. Instructions 76 of software 20 can be stored at one or more locations and can be accessible by one or more computers, servers, operator work stations, and the like. Portions of instructions 76 are described as "modules" to facilitate discussion of the function of various portions of the instructions 76; however, use of the term modules is not intended to be limiting, but rather to indicate a portion of instructions 76 that carries out a function and that may be used alone or combined with one or more modules of the same or another program. Although various steps and modules are described, it is not required to include all steps or all modules in software 20. It is within the scope of this disclosure to carry out the steps and/ore modules in different order(s) than presented here. For example, in the modules described below, main module 94 is described after menu module 78 so that it can be better understood how main module 94 can—optionally and selectively—be programmed in certain circumstances to start menu module 78.

Figure 4A:
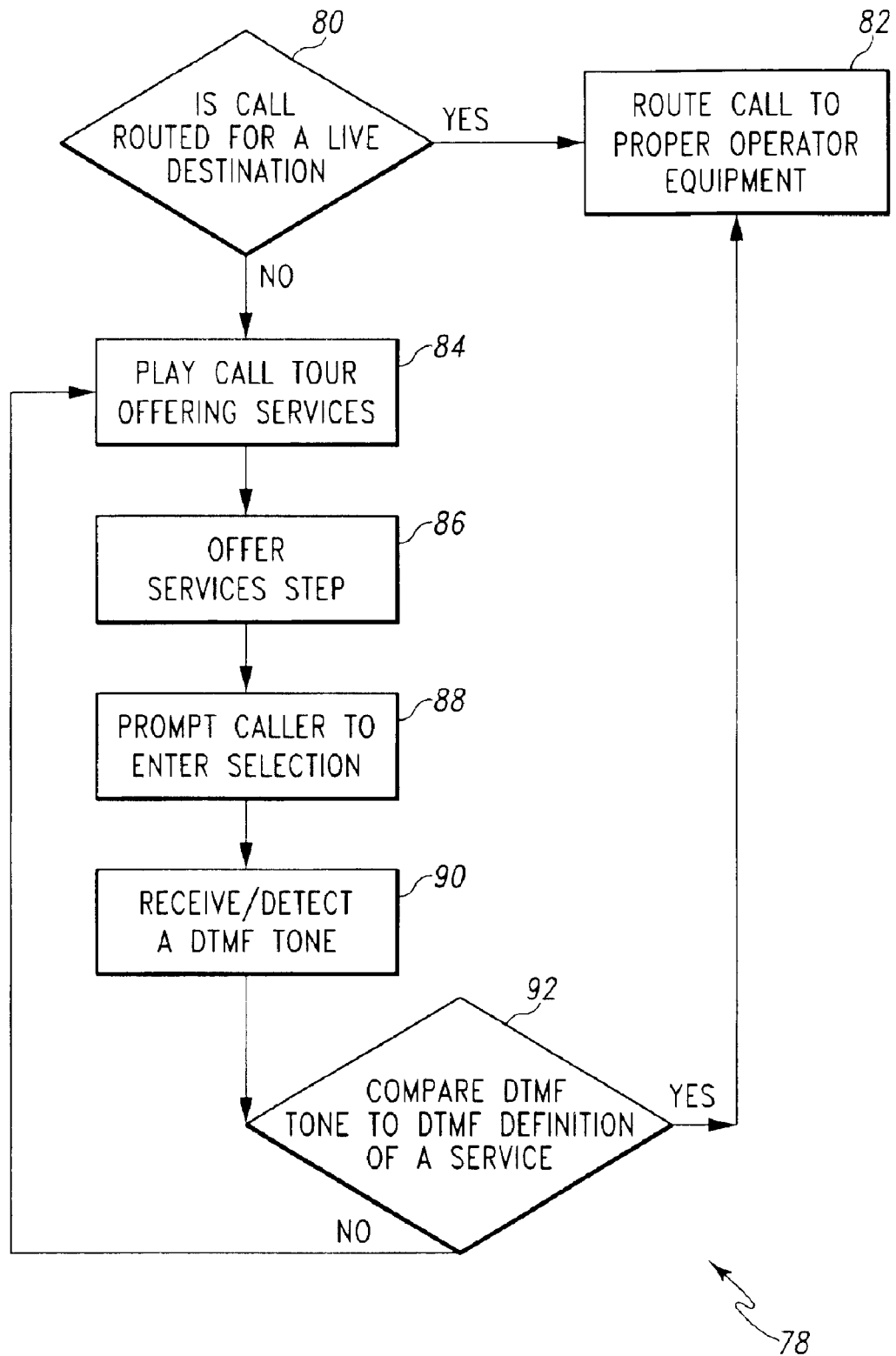
FIG. 4A is a flow chart showing one embodiment of a software menu module and the operation and steps involved when the menu module is run or accessed.

As shown in FIG. 4A, optional menu module 78 can be implemented during a call to notify a caller of the availability of enhanced services and to explain how to access these services. Menu module 78 is provided as shown in FIG. 4A and includes initial call routing determination step 80 that detects or determines whether the call should be routed directly to an operator station or should instead be routed to a call tour. If the call is to be directly routed, then the step 82 of routing the call to the operator station is performed. If the call is not to be directly routed, then the step 84 of playing a call tour is performed. In the example of FIG. 4A, one or more services are offered in a services offering step 86, and the caller is prompted to make a choice or confirm the selection of the one or more services in step 88. Upon entry of a number by the caller and resulting generation of a DTMF tone, the step 90 of detecting and receiving the DTMF tone is performed. The DTMF tone generated by the caller is at step 92 compared to the corresponding services, and if the tone generated matches a service, the step 82 of routing the call to the proper operator station is performed. If the DTMF tone generated does not correspond to a service, steps 84 and following may be repeated, or the call can be routed elsewhere. As known to one of ordinary skill in the art, other methods of selection can be utilized such as detecting a spoken number or other verbal utterance.

Figure 4B:
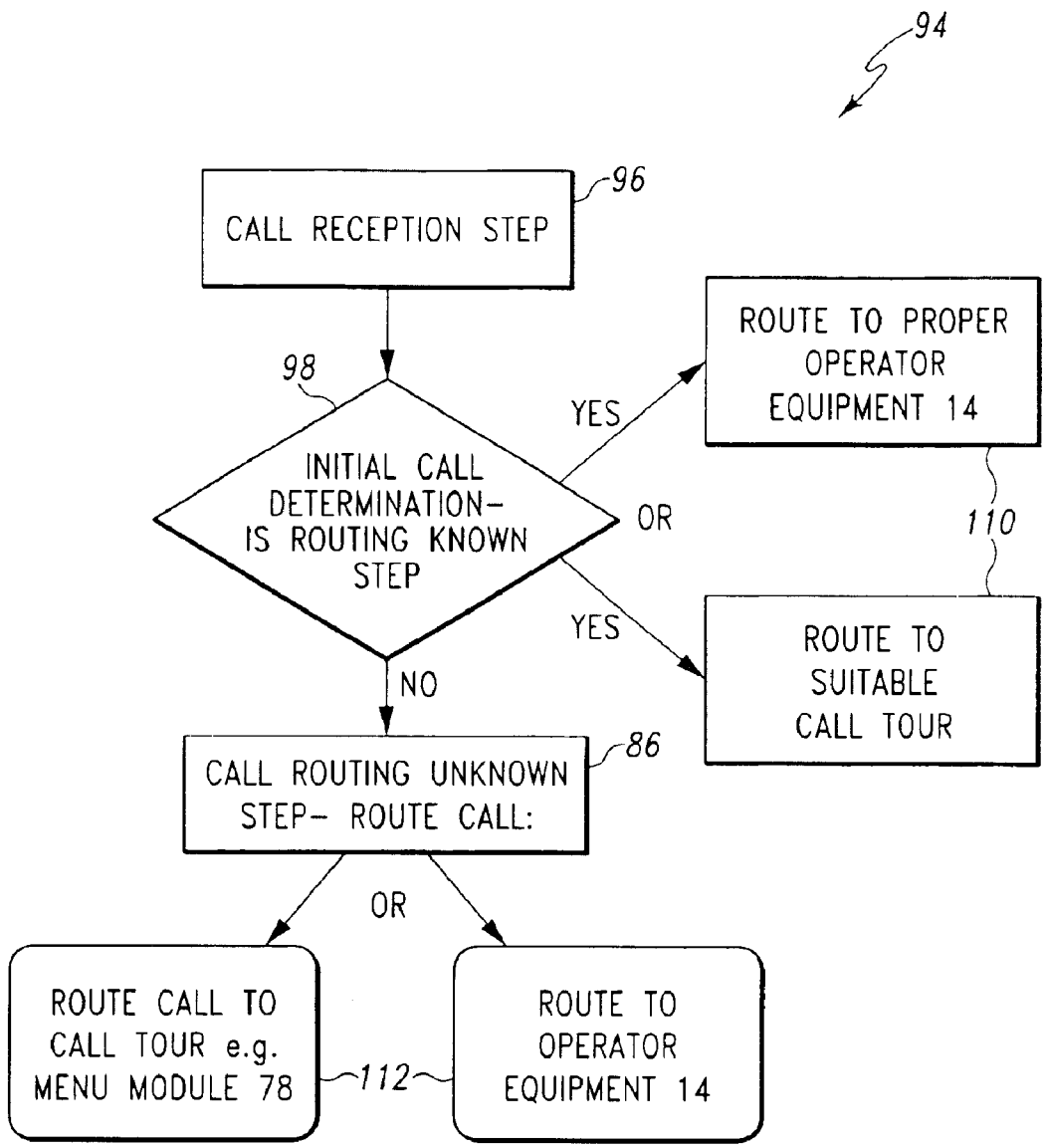
FIG. 4B is a flow chart showing one embodiment of a software main module including initial call routing determinations, showing the operation and steps involved when a call is received at the routing system.

As shown in FIG. 4B, main module 94 can be implemented to determine what services to offer during a call. Main module 94 is illustratively implemented when a call is received at routing system 15. Main module 94 includes providing an initial call reception step 96 in which a call is received at routing system 16, at which point it is tested to determine what to do with the call. After call reception step 96, routing system 16 performs initial routing step 98, in which routing system 16 determines whether the call includes entry of an access number (again, which access number may take many forms) to one or more of the enhanced services.

As such, initial routing step 98 is performed in which main module 94 detects based on entry of an access number whether call routing can be determined from the access number. If routing can be determined, call-routing-known step 110 is performed which routes the call to one of several possible destinations. The destination can be based on the access number and can be, for example, operator equipment 14 for direct live access to an operator. Optionally, call-routing-known step 110 may, based on the access number, access menu module 78 which is then implemented as described above. If call routing cannot be determined, then call-routing-unknown step 112 is performed. In this case, again optionally, the call can be routed to operator equipment 14 (such as to permit a live operator to determine the service and/or payment method), menu module 78 can be implemented, or the call can be connected to a variety of other call tours, and the like.

Figure 4C:
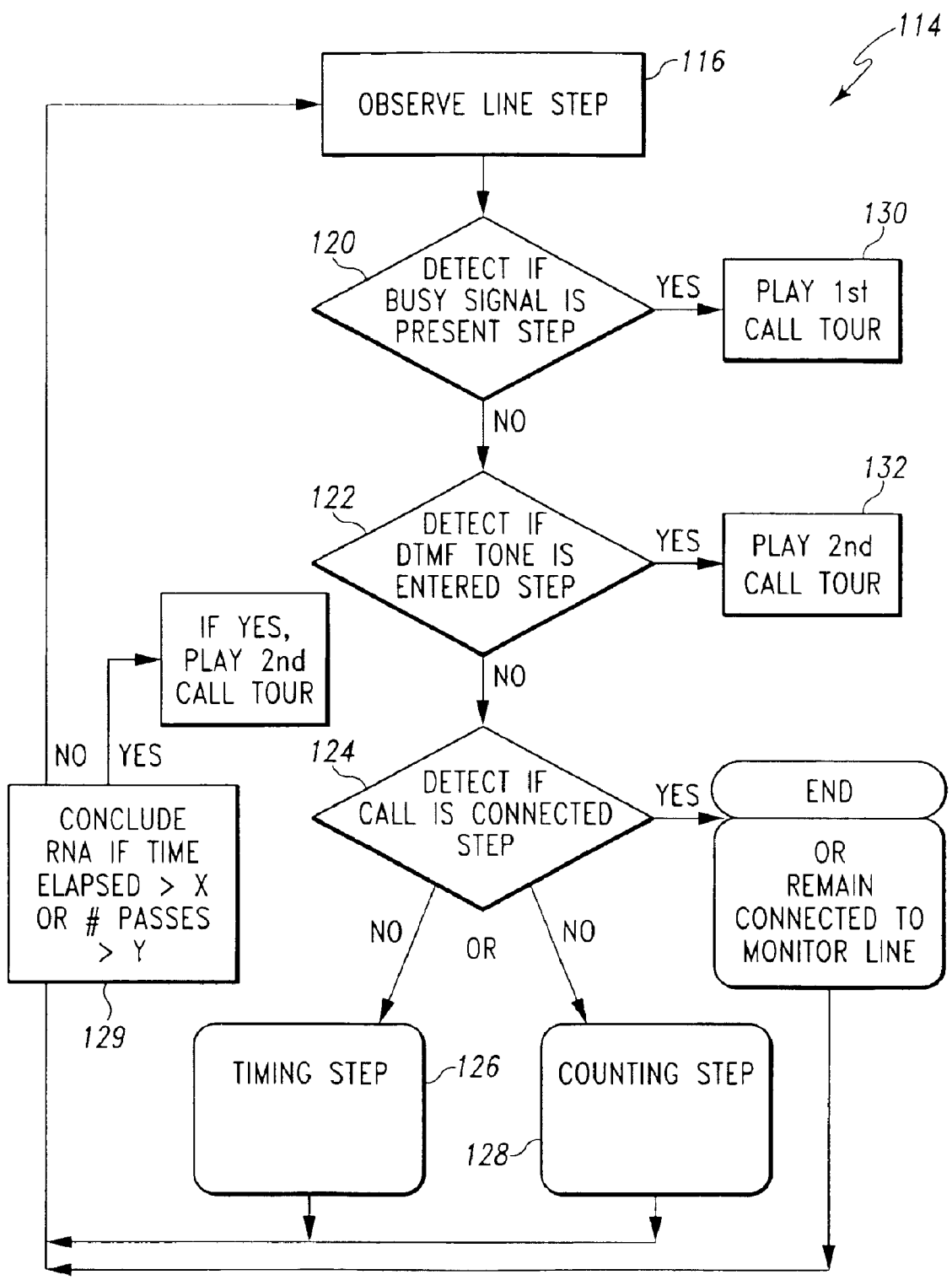
FIG. 4C is a flow chart showing one embodiment of a line condition module showing the operation and steps involved with monitoring the condition of the line.

As shown in FIG. 4C, line condition module 114 can be implemented during a call. Line condition module 114, tests for the condition of the line and presents a caller with one or more options for enhanced services given certain line conditions. For example, menu module 78 may be played upon detection of a ring-no-answer line condition, offering e-mail services. Additional line conditions may be use to trigger playing a call tour, connecting to the operator equipment, or the like. By way of example and not limitation, the line conditions monitored may include a busy signal, a connection, a non-connection (such as when the one party has hung up), an automatically played message (such as when line trouble is detected), connection with a voicemail system, connection with an answering machine, detection of entry of a DTMF tone or signal, speaking of a particular word or phrase, and other detectable line conditions.

Line condition module 114 includes line observing step 116 and testing sequence 118, in which the line condition is tested for a series of conditions. Testing sequence 118 may include one or more of the following steps, depending on which type of line condition is to trigger an offering of enhanced service(s). Testing sequence may include the step 120 of detecting a busy signal, the step 122 of detecting a DTMF tone, and/or the step 124 of detecting a connection. Steps 120 through 124 are provided for illustration, and it is within the scope of this disclosure to include other detectable line conditions, such as those listed above, in place of or in addition to one, more, or all of the steps 120, 122, 124. Although referred to as a "sequence," testing sequence 118 may only test for a single condition.

As illustratively depicted in FIG. 4C, testing sequence 118 tests the line for a busy signal, a DTMF tone or signal, and counts the number of times that testing sequence 118 is performed using a counting step 128. At concluding step 129 a ring no answer (RNA) is determined to be present. A timing step 126 may be used in place of a counting step 128, so that after completing a certain number of passes through testing sequence 118 or after a given time has elapsed, line condition module 114 can be programmed to play a call tour to offer enhanced services.

As shown by way of example in FIG. 4C, if the line condition test is positive in response to step 120 detecting a busy signal, the step 130 of playing a first call tour is performed. If the line condition test is positive in response to step 122 detecting a DTMF, the step 132 of playing a second call tour is performed. If the line condition test is positive in response to step 124 detecting a connection, then a circuit can be left open to continue to monitor the line, for example to offer services after the called party hangs up or to offer services if a DTMF tone is detected. Alternatively, upon such a connection if no services are to be offered, the line condition module 114 can be ended with no further monitoring of the line.

Each line condition, as with each access number and manner of access to routing system 16, may have a unique call tour, or a plurality of line conditions may have the same call tour. An illustrative call tour includes a pre-recorded message which is played to the caller, the message relating to the specific call tour. In another configuration, the call is not connected to a menu module or call tour, and is connected directly to operator equipment. For example, the caller first hears a human operator offering enhanced services instead of a call tour with a message played offering such service.

In the configuration where a call tour such as menu module 78 is played to notify the caller of available services, a pre-recorded message 152 is played to the caller. E-mail service 148 may be offered in message 152 when line condition 154 meets one or more conditions. For example, if line condition 154 is a ring-no-answer condition 156, then message 152 is played which notifies the caller that s/he can initiate e-mail service 148 by performing a selecting step 158, such as depressing a character, remaining on the line, or performing some other activity. If the caller does not wish to initiate e-mail service 148, s/he simply does not perform the selecting step 158, and the call is either terminated or another menu or feature may be offered to the caller.

If the caller performs selecting step 158, the caller is connected to operator equipment 14 and is now on the line with a human operator having access to an information device 26, an e-mail terminal or device 32, or workstation 44. The operator may instruct the caller about use of e-mail service 148, provide billing information and rates, and other relevant information. The operator requests information such as e-mail address of recipient(s), e-mail body text, subject line text, any return e-mail address, and the like. To perform the e-mail service 148, the operator then enters using e-mail device 32 as shown in FIG. 3, or workstation 44 as shown in FIG. 5, information such as recipient e-mail address, any return e-mail address, subject line text, e-mail body text, and the like, and sends the e-mail on behalf of the caller. As shown in FIGS. 3 and 5 respectively, an information device, such as e-mail device 32 or work station 44, is coupled to a network of computers or other e-mail receiving devices, such as the Internet. Any suitable software to facilitate generation and sending such messages may be used.

If the caller is connected to a live operator instead of a call tour, the caller performs selection step 158 by simply notifying the operator which service s/he wishes to use, or whether or not s/he wishes to use a service. The routing system 16 may have already made the determination which service is to be provided and connected the call to the proper operator. As illustratively shown in FIG. 5, if the operator has the skill set, and operator equipment 14 is suitable to perform the service, ACD switch 48 is configured to cooperate with routing system 16 to queue or connect the call based on information detectable about the call or routing information gleaned as provided above. It is within the scope of this disclosure for the operator to activate the modules of FIGS. 4B-E, or otherwise access portions of enhanced services platform 10 as necessary to connect the caller to a suitable operator or to complete the desired service.

Figure 4D:
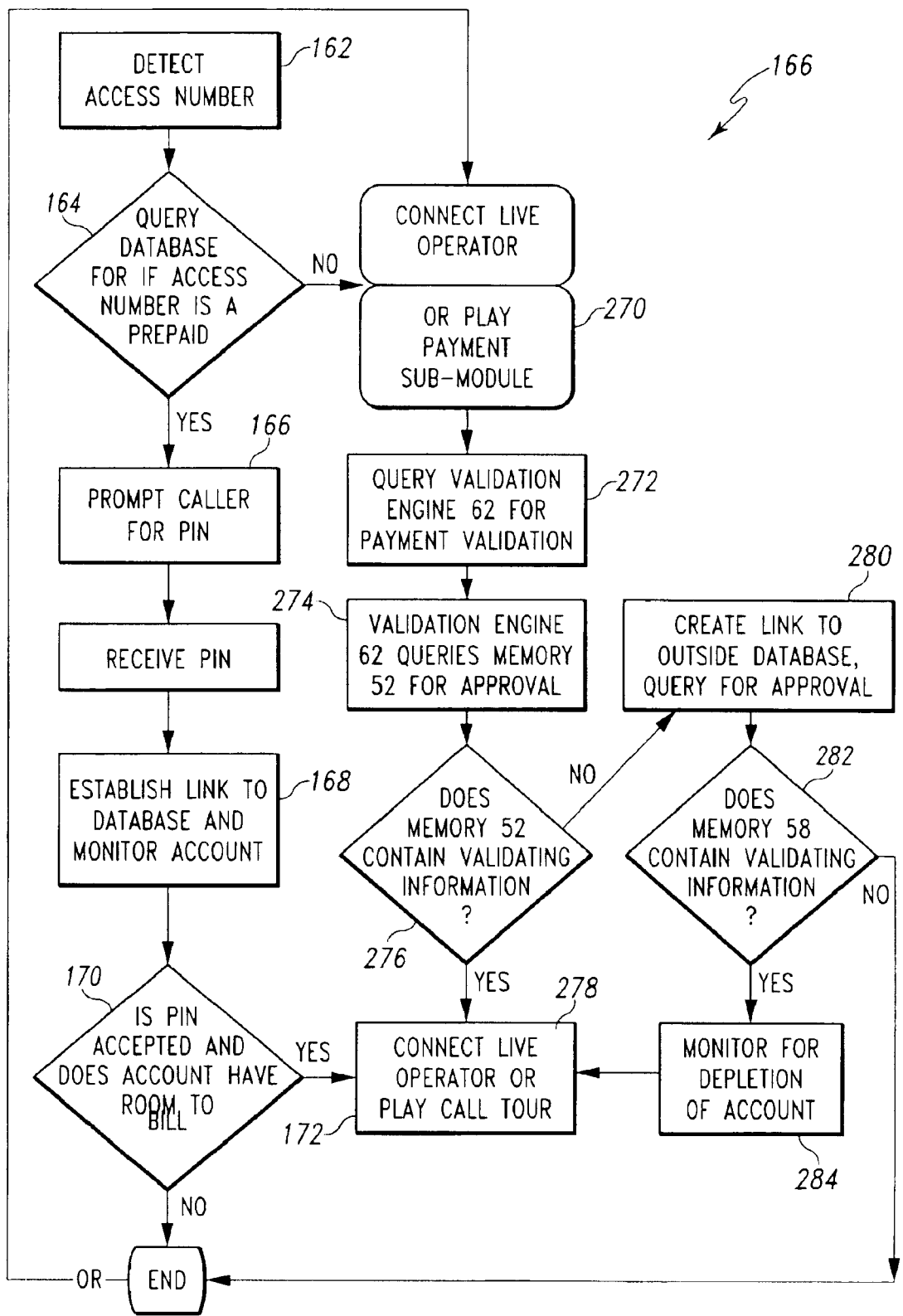
FIG. 4D is a flow chart showing one embodiment of a billing or payment module, showing the operation and steps involved when the billing system module is accessed or executed.

As shown in FIG. 4D, software 20 may include a payment module 160 relating to payment information. Payment module 160 performs step 162 to detect whether the number being dialed is an access number from a pre-paid calling card. Illustratively, computer 50 performs the step 164 of querying memory 52, such as database 56, for whether the dialed number is such a pre-paid access number. If it is, then the caller is prompted at step 166 to enter a personal identification number or other number (collectively PIN) established for that pre-paid calling card.

A separate link, illustratively a "HIL tracking link," is established at step 168 to monitor how much of pre-paid time has been used. As the account is monitored at step 170, when the pre-paid account is empty, the call is terminated. In the illustrative context of a prepaid card shown in FIG. 4D, this is accomplished through the step 168 of creating a connection with a database, such as Oracle database server 75. It is within the scope of this disclosure to continue to monitor the account or to determine once the available amount on the card (and terminate the link after this determination). The service is terminated upon depletion of the account or the available amount.

As shown in FIG. 4D, an optional payment sub-module 270 may be included which serves to query other databases to determine of a payment method is valid. At step 272 validation engine 62 is queried for whether validating information is known locally. Validation engine 62 at step 274 queries memory 52 (illustratively Oracle database application server 74) for whether validating information is known or stored locally, for example in databases 54 or 56. A determination is made at step 276 whether the information is so known, and if it is, at step 278 a live operator may be connected, a particular call tour played, or other options. If step 276 returns a negative answer indicating that the information contained locally does not validate a payment method, at step 280 a link may be established with an outside database such as database 58. At step 282, database 58 is queried for whether validating information is known about the call. If validating information cannot be determined, the call may be terminated or another call tour or a live operator may be presented. If the validating information is obtained, the step 284 of monitoring the credit remaining in an account. Monitoring, as stated above, may be a one-time gathering of the available credit up to and including real-time monitoring of an account's available credit. Once the credit is depleted, the call may be terminated. Again, it is within the scope of this disclosure to offer the caller other call or payment alternatives instead of terminating the call upon depletion of credit in the account. For example, the caller could be prompted to insert coins at a pay phone, enter a calling card number or another prepaid number, or other suitable payment alternatives, some of which are discussed herein.

Once the caller enters an acceptable PIN, the caller is connected at step 172 to an operator or a menu module offering enhanced service(s). If the PIN is not accepted, or if the number being called is not a pre-paid number, then another method of payment is requested at step 174 by a live operator or by another call tour. The caller then enters or provides alternative payment information, for example calling or credit card numbers, third party billing numbers, and the like. If this information, when analyzed, is acceptable, then the caller is connected with an operator who is capable of providing the desired service(s). If this information is not acceptable, the call can either be terminated or the caller can be connected to a general purpose operator, or offered other services or options as appropriate.

Because, in this embodiment, another module detects whether the originating number supports the desired enhanced service(s), the payment module 160 does not include instructions to connect the caller to the operator if the originating number itself supports the enhanced service requested (such as when a call is placed from a home telephone, a cellular phone, or a business phone). However, in an alternative embodiment, this step or function of determining whether a caller is calling from a number that can be billed for the services could be performed in payment module 160. It is within the scope of this disclosure for payment module 160 to be performed, if at all, prior to a call being routed through switch 22 to operator services architecture. In other words, whether or not the payment method attempted is valid can be determined prior to or alternatively after initially accessing part of enhanced services platform 10.

Enhanced services platform 10 is a flexible system that can be configured to permit access to the enhanced services in a variety of ways, and can be configured to accept a variety of forms of payment. For example, a caller calling from home or work may simply charge the service by dialing 1 (one)+an access number for the service; this type of call is sometimes referred to as a "1+call." Payment may be rendered in other ways, for example by using a prepaid phone card, credit card, a calling card, billing the service(s) to a third party number, coin payment in a pay phone, or other suitable billing methods.

Figure 4E:
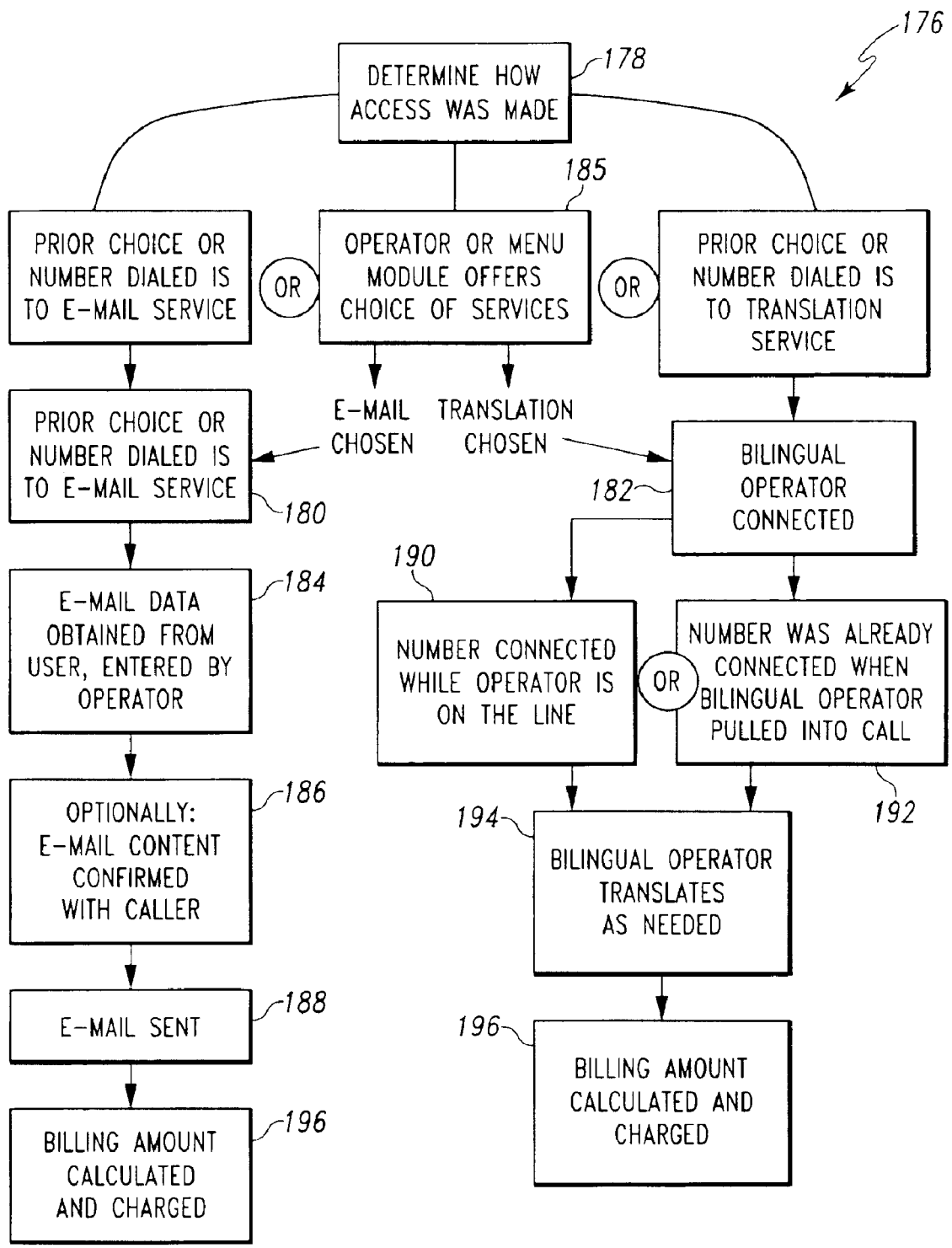
FIG. 4E is a flow chart showing one embodiment of an operator system module showing steps and operation when a call is received at the operator equipment.

As shown in FIG. 4E, operator system (OS) module 176 is illustrated. Optionally, OS module 176 is accessed after the payment method for a requested service is approved, as previously described. It is within the scope of this disclosure to provide access to OS module 176, and determine and approve payment method after such access. When OS module 176 is accessed, step 178 of determining how such access was made may performed. It is within the scope of this disclosure that OS module 176 does not include step 178 of determining access method; for example, this determination may have already been made in another module or elsewhere.

Referring again to FIG. 4E, if the number dialed was specifically to an e-mail service 148 access number, then the call is connected at step 180 with operator equipment 14 accessible by an e-mail operator. The number dialed may have been a toll free number, a local number, or any other sequence of digits that selects the e-mail service, such as within a call an selecting an option from a menu such as menu module 78. Alternatively, the number may be that for translation services, in which case the call is routed at step 182 to a bilingual operator capable of performing the translation service. It is within the scope of this disclosure to play a call tour or to provide a specific access number which identifies the call as one which needs translation for a particular language or dialect. For example, a given access number may be the access number which routes the call directly to a Spanish and English-speaking operator, or to a Japanese and English-speaking operator.

Illustratively, if the number dialed is not an access number specifically for e-mail, or designated in a database as a number to be connected with e-mail service 148, then a more general call tour, menu of offerings, or an operator, can be presented at step 185 to the caller.

As shown in FIG. 4E, once the e-mail operator is connected, the e-mail operator can provide instructions on how the e-mail service works, how much the service costs, and the like. The operator requests required information, and the caller provides the information. Optional information can also be provided, for example a subject line, a salutation, a callback number, and the like. Regardless of whether prompted by the operator or provided by the user without prompting, the step 184 of entering information provided by the caller is performed by the operator using operator equipment 14. E-mail terminal 32 is used to enter the required e-mail fields and other desired fields, and may contain any software capable of creating and sending an e-mail, such as Microsoft Outlook®, GroupWise®, and the like. The e-mail operator may confirm the contents of the e-mail with the caller at step 186 to confirm accuracy. The e-mail operator then performs step 188 sending the e-mail over the network, such as the Internet.

The amount owed for e-mail service 148 can be calculated in any number of ways, including a flat fee per e-mail, a fee for each addressee, a charge for the time it takes to create the e-mail, a charge by number of words, etc. Also, a caller may be presented with a choice of how he wants to pay.

As illustrated in the portion of FIG. 4E showing the translation services, the bilingual operator can be first accessed before a third (or other) party is connected to the caller. The third party can be connected at step 190 either by the operator or by the caller. Otherwise, in one particular configuration, the caller can access the bilingual operator during the course of a call at step 192. As described above illustratively, the line condition module 114 may be running, which determines that a caller who is in a call has depressed, for example, a number which indicates that the call is to be connected to a bilingual operator.

After the caller is connected with an operator capable or equipped to provide translation service to the caller, and the caller is also connected to the desired third (or other) party, the bilingual operator performs the step 194 of translating the conversation as needed. It is within the scope of this disclosure for the connections to be established and controllable to refine the process of translation. It is within the scope of this disclosure to adjust the volume to one party or the other so that while the one party is speaking, the other party does not hear the one party at full volume (or at all), and while the operator is speaking to the other the other hears the operator at full volume, and vice versa.

After the service is rendered, the billing amount is calculated and charged at step 196 against or to the proper account. Again, various billing methods may be used to pay for the enhanced service, including but not limited to a flat fee for a local translation, a charge per unit time, a charge per unit of time that varies based on a number of factors such as time of day, number called, originating ANI, and the like.

As shown in FIGS. 1–3, operator equipment 14 is provided, enabling an enhanced services operator to communicate with the caller and perform enhanced services such as e-mail service 148 and translation service 150. FIG. 2 shows an illustrative system including operator equipment 14 to enable the enhanced services operator to provide translation services. Operator equipment 14 is operatively coupled to computer 50 and/or memory 52 and/or switch 22, providing the operator with the ability to access various databases as needed, to access other networks as needed, and to connect calls requested by the caller. Operator equipment 14 is illustrated as including operator communications device 26, which illustratively includes a listening device 28, a speaking device 30, and an information device such as work station 44 or e-mail terminal 32. These devices can be separate devices (for example a separate headset, separate microphone, and separate computer) or one or more of the devices can be part of a unitary apparatus. For example, such an apparatus could be a computer having speakers and a built-in microphone, permitting the operator to engage in 2-way communication with the caller and access databases using the computer. The connection with such databases could be through a separate link or through link 17 described above.

FIG. 3 shows an illustrative system including operator equipment 14 to enable the enhanced services operator to provide e-mail services. E-mail operator equipment 14 in this example is similar to that described with reference to FIG. 2. Operator equipment 14 of FIG. 3 is operatively coupled to computer 50 and/or memory 52 and/or switch 22, providing the operator with the ability to access various databases as needed, to access other networks as needed, and to connect calls requested by the caller. E-mail operator equipment 14 is illustrated as including operator communications device 26, which illustratively includes a listening device 28, a speaking device 30, and an information device. In the case of the e-mail operator equipment 14, information device is an e-mail terminal 32 operatively coupled to a network of communication devices capable of receiving electronic messages (e-mail), such as the Internet. The connection with this network can be through a separate link or can be through link 17 described above.

In one exemplary embodiment, shown in FIG. 5, ACD switch 48 is operably coupled by HIL release link trunks 67 to local switch 68, illustratively a second Harris 20/20 switch similar to ACD switch 48. Illustratively, local switch 68 includes two links 69, 70 to auto op computer 60. One is a T1 link 69. In this example, link 69 includes twenty-four (24) voice channels coupled to the communications card. The second link is the Host Interface link (HIL) 70 which is coupled to a RS232 serial communications port (not shown). In this example link 70 carries out-of-band signaling used to control the 24 voice channels. The HIL protocol is described in detail in VoiceFrame Programming—Reference Manual, Manual 958935-01, Harris Corporation, Digital Telephone Systems Division 1991, which is expressly incorporated herein by reference. Although specific links, ports, and communications protocols are disclosed, it will be recognized by those of ordinary skill in the art that other types of links, ports, and protocols are within the scope of this disclosure.

Based on call information and the routing determined therefrom, routing system 16 may determine that the call should be routed to operator equipment 14. Thus, local switch 68 completes a circuit between caller equipment 18 and operator equipment 14, along link 67 such as the illustrative RLT T1 link of FIG. 5. The call and information is sent from local switch 68 to ACD switch 48 (illustratively by out of band signaling) along link 67. Information passed illustratively includes originating number and/or ANI, access number, an ACD pattern number used to determine which operator equipment 14 to connect the call to, and the like. ACD switch 48 connects the call to a suitable operator teleset 42 based on which such operator teleset 42 corresponds with an operator having the skill set to provide the required service. The proper operator teleset 42 is illustratively selected by looking at the ACD pattern number stored in memory 52. The call is routed to available operator equipment 14 that is logged into the desired pattern as defined by ACD switch 48 cooperating with memory 52.

In one example, once a call is presented to a particular operator, that operator is provided certain information regarding the call based on a call tour, similar to the above description relating to call tour selection. The call information in this example is presented on the operator information device, such as operator work station 44. The call information and voice signals are carried to operator equipment 14 on link 17, illustratively a WIL Release Line Trunk (RLT) link, as shown in FIG. 5. Operator equipment 14 includes an operator teleset 42 coupled to, for example, an operator headset (or listening device 28 and speaking device 30) and operator workstation 44. Operator teleset 42 is operatively coupled to ACD switch 48 with a link 17 such as illustrative 1B+D digital link. The data and voice signals are decoded from a single digital signal at operator teleset 42 into separate voice channel and a data channel. The voice channel is connected by a link to, for example, an operator headset. The data is sent from teleset 42 to operator workstation 44 through a link 71, illustratively an RS232 link as shown in FIG. 5. This process is reversed when sending information from the workstation and headset to the teleset.

As suggested by FIG. 5, ACD switch 48 and teleset 42 cooperate to connect the call to operator equipment 14. Data about the call (for example the originating number and the access number) is sent to the operator equipment 14, illustratively from teleset 42 to workstation 44 through link 71.

The information is examined and processed similar to processing described above relating to auto op computer 60. The WIL protocol is described in the VoiceFrame Programming Reference Manual available from Harris Digital Telephone Systems Division, 1991. The access number and originating number are passed to the oracle database services through a link, illustratively a TCP/IP connection, on LAN 72. The database services cooperate with a live operator program running on the operator work station, to determine what information to present to the operator.

The live op program is illustratively resident on the operator workstation 44 and prompts the operator with a call tour having a script the operator speaks to the caller. In an illustrative e-mail call tour, the operator is prompted to ask the caller for the destination e-mail address, caller's e-mail address, caller's name, message, and the like. After the operator enters all information into workstation 44, the operator executes a command to send the e-mail. The e-mail message is illustratively sent through the Ethernet LAN connection to an e-mail server where the message is formatted and sent to the recipient over the Internet.

With reference to FIG. 3, again, devices 28, 30, and 32 can be separate devices (for example a separate headset, separate microphone, and separate computer) or one or more of the devices can be part of a unitary apparatus. For example, such an apparatus could be a computer having speakers or headphones and a built-in microphone, permitting the operator to engage in 2-way communication with the caller and access databases and/or the network or Internet, as mentioned in the previous paragraph, using the computer.

Link 17 which links operator equipment 14 to other parts of the system may be, in practice, a plurality of links. For example, as shown in FIG. 5, three separate links operatively connect a given operator to various parts of the system. The operator has access through Ethernet 220 to computer 52, has a direct connection to validation engine 62, and another connection into switch 22, specifically to ACD switch 48. In this way, the connection between operator and caller can be maintained, but when it is no longer necessary to have the connection routed through computer 50 (because, illustratively, no information or processing by computer 50 is then required), the connection can be maintained directly between the operator, through switch 22, and to caller equipment 14, freeing computer 50. One of ordinary skill in the art will recognize that various connection types and paths are within the scope of this disclosure.

The operator may have additional information available through other memory or databases 58, or by way of, for example, a connection to the Internet or another network of communications devices. Such access to the computer, memory, databases, or other sources of information may assist the operator in performing enhanced services such as e-mail and translation. For example, the operator may have access to a translation dictionary to permit the operator to look up words the operator is having difficulty translating from memory. Also for example, the operator may have access to a database of e-mail addresses. Such a database may be pre-established by the caller and only accessible by the caller or may be more commonly available.

Links, as used herein, may take many forms. It is within the scope of this disclosure for links to include wires, cables, wireless connections (such as those using transmitters and receivers), and similar technologies. As used herein, the terms line, connection, and call are intended to cover any type of connection through any medium capable of transmitting or conducting information in any form. The terms line, call, and connection are not intended to be limited to a physical connection or coupling, but may include such connections or couplings.

Although the invention has been described in detail with reference to certain preferred or illustrative embodiments, variations and modifications exist within the scope and spirit of the invention as described and as defined in the claims.

What is claimed is:

1. A system for sending an e-mail using a communication network comprising:
    a routing system for receiving a call from a caller, wherein the routing system includes:
        at least one switch responsive to an instruction set, the instruction set configured to instruct the switch to route the call to the operator equipment, and
        a computer operatively coupled to the at least one switch and to a database containing data, the computer cooperating with the instruction set and the at least one switch to route the call to the operator equipment upon occurrence of an entry of an access number matching data in the database;
    an operator equipment to enable communications between an operator and the caller,
    the routing system operably coupled to the operator equipment and configured to route the call to the operator equipment under a predetermined condition; and
    an e-mail device configured to enable the operator to construct an e-mail from verbal information provided by the caller and to send the e-mail to a recipient designated by the caller.

2. A system for sending an e-mail using a communication network comprising:
    a routing system for receiving a call from a caller, wherein the routing system includes:
        at least one switch responsive to an instruction set, the instruction set configured to instruct the switch to route the call to the operator equipment, and
        a computer operatively coupled to the at least one switch and to a database containing data, the computer cooperating with the instruction set and the at least one switch to route the call to the operator equipment upon occurrence of an entry of one or more DTMF tones matching data in the database;
    an operator equipment to enable communications between an operator and the caller;
    the routing system operably coupled to the operator equipment and configured to route the call to the operator equipment under a predetermined condition; and
    an e-mail device configured to enable the operator to construct an e-mail from verbal information provided by the caller and to send the e-mail to a recipient designated by the caller.

3. A system for sending an e-mail using a communication network comprising:
    a routing system for receiving a call from a caller,
    an operator equipment to enable communications between an operator and the caller,
    the routing system operably coupled to the operator equipment and configured to route the call to the operator equipment under a predetermined condition, and
    an e-mail device configured to enable the operator to construct an e-mail from verbal information provided by the caller and to send the e-mail to a recipient designated by the caller,
    wherein the routing system includes a computer operably coupled to an instruction set, the computer issuing a first command upon detection of a desired condition, the first command configured to direct a switch to connect the call to the operator equipment.

4. The system of claim 3, wherein the computer is operably coupled to a database containing data, and wherein the condition comprises entry of an access number matching data in the database.

5. The system of claim 3, wherein the computer is operably coupled to a database containing data, and wherein the desired condition comprises an originating number at least part of which matches at least part of a number in the database.

6. The system of claim 3, wherein the instruction set issues a second command to the computer to play a call tour to offer at least one service to the caller and request entry of a selection number by the caller, and the computer routes the call to the operator equipment when the desired condition comprises one or more DTMF tones that matches a predetermined one or more DTMF tones.

7. The system of claim 3, wherein the operator equipment includes a plurality of operator stations.

8. An enhanced telephone services platform comprising:
    a routing system for receiving a call from a caller,
    a plurality of operator communications devices each configured to enable communications between an operator and the caller,
    the routing system operably and selectively couplable to each operator communications device and configured to operatively couple to a caller communications device used by the caller to route the call to the operator communications device under at least one predetermined condition, and
    an information device configured to enable the operator to construct an e-mail from verbal information provided by the caller and to send the e-mail to a recipient designated by the caller,
    wherein at least one of the plurality of operator communications devices is operatively coupled to an automatic call distribution system configured to route the call to the at least one of the plurality of operator communications devices based on the at least one predetermined condition, and the automatic call distribution system includes a switch responsive to a command detecting the presence of the at least one predetermined condition.

9. The enhanced telephone services platform of claim 8, wherein at least one of the plurality of the operator communications devices includes a speaking device and a listening device, and is configured to be operatively coupled to the caller communications device during at least a portion of the call so that the operator can serve as an translator during the at least a portion of the call.

10. The enhanced telephone services platform of claim 8, further comprising a computer that issues the command based on the predetermined condition of entry of a DTMF tone by the caller.

11. The enhanced telephone services platform of claim 8, further comprising a computer that issues the command based on the predetermined condition of an originating number.

12. The enhanced telephone services platform of claim 8, further comprising a computer that issues the command based on the predetermined condition of a busy signal.

13. The enhanced telephone services platform of claim 8, further comprising a computer that issues the command based on the predetermined condition of entry of an access number.

14. The enhanced telephone services platform of claim 13, wherein the switch is operatively coupled to a telecommunications network configured to send the access number to the routing system.

15. A method of sending an electronic message, the details of which are provided by a caller using a communications device to a telephone communications system operator, comprising the steps of:

providing an operator equipment, providing a routing system to selectively connect to the operator equipment a call placed by the caller using the communications device, routing the call to the operator equipment using the routing system to enable communications between the caller and the operator, inputting information provided by the caller into the operator equipment to create an electronic message, and sending the electronic message to at least one recipient, wherein inputting information provided by the caller includes inputting verbal information provided by the caller into an alphanumeric readable format.

16. A method of sending an electronic message, the details of which are provided by a caller using a communications device to a telephone communications system operator, comprising the steps of:

providing an operator equipment, providing a routing system to selectively connect to the operator equipment a call placed by the caller using the communications device, routing the call to the operator equipment using the routing system to enable communications between the caller and the operator, inputting information provided by the caller into the operator equipment to create an electronic message, sending the electronic message to at least one recipient, and coupling software to the computer configured to compare an entered DTMF tone entered by a caller to a predetermined DTMF tone and, upon a match of the entered DTMF tone and the predetermined DTMF tone, the computer issues the command to the routing system to connect the call to the operator equipment, wherein providing a routing system includes providing a computer that issues a command for a switch to connect the call to the operator equipment, and coupling software to the computer includes software which plays a pre-recorded message prompting a caller to enter a number corresponding to the predetermined DTMF tone to access the operator.

17. The method of claim 16, further comprising coupling software to the computer, the software configured to cooperate with the computer to compare at least a portion of the originating number to a database and, upon a match of the at least a portion of the originating number and a number in the database, issuing a command with the computer to at least part of the routing system to connect the call to the operator equipment.

18. The method of claim 16, further comprising coupling software to the computer configured to cooperate with the computer to detect a line condition and compare the detected line condition to at least one known line condition and, upon a match of the detected line condition and the known line condition, issuing a command with the computer to at least part of the routing system to connect the call to the operator equipment.

19. The method of claim 16, further comprising the step of confirming the accuracy of the information input.

20. A method of sending an electronic message, the details of which are provided by a caller using a communications device to a telephone communications system operator, comprising the steps of:

providing an operator equipment, providing a routing system to selectively connect to the operator equipment a call placed by the caller using the communications device, wherein providing the routing system includes providing a computer and a switch wherein the computer issues a command for the switch to connect the call to the operator equipment, routing the call to the operator equipment using the routing system to enable communications between the caller and the operator, inputting information provided by the caller into the operator equipment to create an electronic message, sending the electronic message to at least one recipient, and coupling software to the computer configured to compare an entered DTMF tone entered by a caller to a predetermined DTMF tone and, upon a match of the entered DTMF tone and the predetermined DTMF tone, issuing the command with the computer to at least part of the routing system to connect the call to the operator equipment, wherein coupling software to the computer includes software which plays a pre-recorded message prompting a caller to enter a number corresponding to the predetermined DTMF tone to access the operator.

21. A system for translating a conversation using a telecommunications network comprising:

a routing system for receiving a call from a caller, an operator equipment to enable communications between an operator and the caller, the routing system operably coupled to the operator equipment and configured to route the call to the operator equipment under a predetermined condition to create a first connection, the operator equipment including an operator terminal to permit the operator to connect the call with a communications device of a third party creating a second connection to enable communication between at least the caller and the third party, and to enable communications between the operator and at least the caller during at least a portion of the call, at least one of the first and second connections transmitting a first verbal information from the operator, the first verbal information including a translation of a second verbal information from one of the caller and the third party to the other of the caller and the third party, wherein the operator equipment, the routing system, the first connection, and the second connection are configured so that the operator is in communication with both the caller and the third party during at least a portion of the call.

22. The system of claim 21, wherein the operator equipment includes a plurality of operator terminals.

23. A system for translating a conversation using a telecommunications network comprising:
a routing system for receiving a call from a caller,
an operator equipment to enable communications between an operator and the caller,
the routing system operably coupled to the operator equipment and configured to route the call to the operator equipment under a predetermined condition to create a first connection,
the operator equipment including an operator terminal to permit the operator to connect the call with a communications device of a third party creating a second connection to enable communication between at least the caller and the third party, and to enable communications between the operator and at least the caller during at least a portion of the call, at least one of the first and second connections transmitting a first verbal information from the operator, the first verbal information including a translation of a second verbal information from one of the caller and the third party to the other of the caller and the third party,
wherein the routing system includes at least one switch responsive to an instruction set, the instruction set configured to instruct the switch to route the call to the operator equipment, and a computer operatively coupled to the at least one switch, the computer cooperating with the instruction set and the at least one switch to route the call to the operator equipment upon occurrence of the predetermined condition.

24. The system of claim 23, wherein the computer is operably coupled to a database containing data, and wherein the predetermined condition is an entry of an access number matching data in the database.

25. The system of claim 23, wherein the computer is operably coupled to a database containing data, and wherein the predetermined condition is an entry of one or more DTMF tones matching data in the database.

26. The system of claim 23, wherein the routing system includes a computer operably coupled to an instruction set, the computer issuing a first command upon detection of a desired condition, the first command configured to direct a switch to connect the call to the operator equipment.

27. The system of claim 26, wherein the computer is operably coupled to a database containing data, and the wherein the desired condition detected is entry of an access number.

28. The system of claim 26, wherein the computer is operably coupled to a database containing data, and wherein the desired condition detected is an originating number at least part of which matches at least part of a number in the database.

29. The system of claim 26, wherein the instruction set issues a second command to the computer to play a call tour to offer at least one service to the caller and request entry of a selection number by the caller, and wherein the desired condition comprises one or more DTMF tones that matches a predetermined one or more DTMF tones.

30. An enhanced services system for a telecommunications network comprising:
operator equipment accessible by an operator serving in the enhanced services system,
a routing system for selectively routing a call from a caller to the operator equipment, the routing system including a computer and software accessible by the computer, the computer cooperating with the software to route the call to the operator equipment upon an occurrence of a predetermined condition, and
the predetermined condition is a member selected from the group consisting of: an entry of an access number to reach the operator equipment, an entry of one or more DTMF tones in response to a call tour requesting the entry, and a detection of a predetermined line condition.

31. The system of claim 30, wherein the predetermined condition is the entry of one or more DTMF tones, and the software cooperates with the computer to play the call tour, the call tour providing to the caller instructions for selecting one of at least an e-mail delivery service and a translation service, both the e-mail and translation services provided by an operator.

32. The system of claim 30, wherein the predetermined condition is the entry of an access number, and based on the access number the call is routed to one of an e-mail delivery service or a translation service.

33. The system of claim 32, wherein the software and computer are operatively coupled to a database containing data relating to the validity of the access number, wherein the call tour is selected based on a match of data in the database and at least a portion of the access number.

34. The system of claim 30, wherein the software and computer further cooperate to perform a payment module including a payment instruction provided to the caller to enter payment information, and the software and computer further cooperate to determine the validity of the payment information.

35. The system of claim 34, wherein the software and computer are operatively coupled to a database containing data relating to validity of payment information.

36. The system of claim 35, wherein the data relates to validity of charging the service to an originating number.

37. The system of claim 35, wherein the data relates to validity of charging the service to a pre-paid card account.

38. The system of claim 35, wherein the data relates to validity of charging the service to a third party number.

39. A method of translating a telephone conversation comprising the steps of:
providing an operator equipment,
providing a routing system including a computer and a switch to selectively connect to the operator equipment a call placed by the caller using a communications device, wherein the computer issues a command for the switch to connect the call to the operator equipment,
routing the call to the operator equipment using the routing system to enable communications between at least the caller and a bilingual operator,
translating at least a portion of the conversation between a caller and a third party, and
coupling software to the computer configured to compare an entered DTMF tone entered by the caller to a predetermined DTMF tone and, upon a match of the entered DTMF tone and the predetermined DTMF tone, the computer issues a command to the routing system to connect the call to the operator equipment,
wherein coupling software to the computer includes coupling software to the computer which plays a prerecorded message prompting a caller to enter a number corresponding to the predetermined DTMF tone to access the operator.

40. The method of claim 39, further comprising the step of using the operator equipment to connect the third party to the call.

41. The method of claim 39, further comprising the step of connecting the call to the operator equipment after the caller and the third party are in the call.

42. The method of claim 39, wherein translating at least a portion of the conversation includes translating at least a portion of the words spoken by the caller to the third party.

43. The method of claim 39, wherein translating at least a portion of the conversation includes translating at least a portion of the words spoken by the third party to the caller.

44. A method of translating a telephone conversation comprising the steps of:

providing an operator equipment, providing a routing system to selectively connect to the operator equipment a call placed by the caller using a communications device, routing the call to the operator equipment using the routing system to enable communications between at least the caller and a bilingual operator, and translating at least a portion of the conversation between a caller and a third party, wherein providing a routing system includes providing a routing system configured to route a first call to a first access number and a second call to a second access number, the first and second access numbers causing the routing system to route the first and second calls to different operator equipment, the first access number being an access number for an operator equipment accessible by an operator capable of translating a first language, and the second access number being an access number for an operator equipment accessible by an operator capable of translating a second language.

45. A computer readable medium having stored thereon a plurality of sequences of instructions which when executed by a processor, cause the processor to perform a method comprising the steps of:

determining entry of an access number for accessing an operator equipment which, in cooperation with a routing system, enables a bilingual operator to communicate with a caller and a third party, issuing a command for a switch to connect the call to the operator equipment, routing a call to the operator equipment using the routing system to enable communications between at least the caller and the bilingual operator, and selecting a call tour based on the access number and playing the call tour to the caller.

46. The computer readable medium of claim 45, wherein the method further comprises the step of connecting the call to the third party upon receipt of a command from the operator equipment.

47. The computer readable medium of claim 45, wherein the method further comprises the step of querying a first database and comparing a first information detectable about the call to the database to select the call tour.

48. The computer readable medium of claim 45, wherein the method further comprises the steps of querying a first database and comparing a first information detectable about the call to the first database, and upon failure to find a matching value in the database, querying a second database and comparing the first information to the second database to select the call tour.

49. A computer readable medium having stored thereon a plurality of sequences of instructions which when executed by a processor, cause the processor to perform a method comprising the steps of:

determining entry of an access number for accessing an operator equipment which, in cooperation with a routing system, enables a bilingual operator to communicate with a caller and a third party, issuing a command for a switch to connect the call to the operator equipment, routing a call to the operator equipment using the routing system to enable communications between at least the caller and the bilingual operator, and populating a brand field to play an audible brand to the caller.

50. The computer readable medium of claim 49, wherein the method further comprises the step of connecting the call to the third party upon receipt of a command the caller equipment.

51. A computer readable medium having stored thereon a plurality of sequences of instructions which when executed by a processor, cause the processor to perform a method comprising the steps of: determining entry of an access number for accessing an operator equipment which, enables an operator to create and send an e-mail to a third party based on input from a caller, issuing a command for a switch to connect the call to the operator equipment, routing a call to the operator equipment using the routing system to enable communications between the caller and the operator, and selecting a call tour based on the access number and playing the call tour to the caller.

52. The computer readable medium of claim 51, wherein the method further comprises the step of querying a first database and comparing a first information detectable about the call to the database to select the call tour.

53. The computer readable medium of claim 51, wherein the method further comprises the steps of querying a first database and comparing a first information detectable about the call to the first database, and upon failure to find a matching value in the database, querying a second database and comparing the first information to the second database to select the call tour.

54. The computer readable medium of claim 51, wherein the method further comprises the step of populating a brand field to play an audible brand to the caller.

* * * * *